US008411178B2

(12) United States Patent
Ogura et al.

(10) Patent No.: US 8,411,178 B2
(45) Date of Patent: Apr. 2, 2013

(54) SOLID-STATE IMAGING APPARATUS, IMAGING SYSTEM AND DRIVING METHOD FOR SOLID-STATE IMAGING APPARATUS

(75) Inventors: Masanori Ogura, Kawasaki (JP); Toru Koizumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 454 days.

(21) Appl. No.: 12/547,560

(22) Filed: Aug. 26, 2009

(65) Prior Publication Data

US 2010/0060754 A1 Mar. 11, 2010

(30) Foreign Application Priority Data

Sep. 9, 2008 (JP) ................................. 2008-231190

(51) Int. Cl.
*H04N 5/335* (2011.01)

(52) U.S. Cl. .................... 348/294; 348/241; 348/308

(58) Field of Classification Search .................. None
See application file for complete search history.

(56) References Cited

U.S. PATENT DOCUMENTS

| 6,670,990 | B1 | 12/2003 | Kochi et al. ............... 348/310 |
| 6,960,751 | B2 | 11/2005 | Hiyama et al. ............ 250/208.1 |
| 7,016,089 | B2 | 3/2006 | Yoneda et al. ............. 358/482 |
| 7,324,144 | B1 | 1/2008 | Koizumi .................... 348/294 |
| 7,429,764 | B2 | 9/2008 | Koizumi et al. ........... 257/292 |
| 7,466,003 | B2 | 12/2008 | Ueno et al. ................. 257/462 |
| 7,554,591 | B2 | 6/2009 | Kikuchi et al. ............ 348/308 |
| 7,714,904 | B2 | 5/2010 | Kudoh |
| 7,812,876 | B2 | 10/2010 | Hiyama et al. |
| 7,916,183 | B2 | 3/2011 | Kudoh |
| 8,081,241 | B2 | 12/2011 | Noda et al. |
| 8,106,899 | B2 | 1/2012 | Kimura |
| 2003/0020969 | A1 | 1/2003 | Kimura |
| 2004/0183930 | A1 | 9/2004 | Masuyama et al. ............ 348/294 |
| 2006/0043440 | A1 | 3/2006 | Hiyama et al. ................ 257/291 |
| 2006/0044439 | A1 | 3/2006 | Hiyama et al. ................ 348/308 |
| 2006/0132634 | A1 | 6/2006 | Kudoh |
| 2006/0157759 | A1 | 7/2006 | Okita et al. .................... 257/292 |
| 2007/0052831 | A1 | 3/2007 | Ogura et al. ................... 348/308 |
| 2007/0126886 | A1 | 6/2007 | Sakurai et al. ............. 348/222.1 |
| 2008/0024630 | A1 | 1/2008 | Hiyama et al. |
| 2008/0036891 | A1 | 2/2008 | Ono et al. ...................... 348/308 |
| 2008/0049128 | A1* | 2/2008 | Murata et al. ................. 348/294 |
| 2008/0062294 | A1 | 3/2008 | Koizumi et al. .............. 348/300 |
| 2008/0062295 | A1 | 3/2008 | Fujimura et al. ............. 348/301 |

(Continued)

FOREIGN PATENT DOCUMENTS

| JP | 63-294182 A | 11/1988 |
| JP | 2001-045378 A | 2/2001 |

(Continued)

*Primary Examiner* — Chieh M Fan
*Assistant Examiner* — Angel L Garces-Rivera
(74) *Attorney, Agent, or Firm* — Fitzpatrick, Cella, Harper & Scinto

(57) ABSTRACT

A solid-state imaging apparatus, an imaging system and a driving method for the solid-state imaging apparatus that can reduce jaggy while increasing speed of operation for reading out signals are provided. The driving method includes a first step of storing one or more signals from the plurality of pixels in each of the plurality of first holding units; a second step of adding the signals from the plurality of pixels stored in the plurality of first holding units; and a third step of outputting the signal stored in the second holding unit, such that at least a part of a period of the first step is overlapped with a period of the third step.

18 Claims, 20 Drawing Sheets

U.S. PATENT DOCUMENTS

| | | | |
|---|---|---|---|
| 2008/0062296 A1 | 3/2008 | Ogura et al. | 348/308 |
| 2009/0073298 A1 | 3/2009 | Ogura et al. | 348/308 |
| 2009/0159783 A1 | 6/2009 | Koizumi et al. | 250/208.1 |
| 2009/0207293 A1 | 8/2009 | Ryoki et al. | 348/308 |
| 2009/0219429 A1 | 9/2009 | Ogura et al. | 348/308 |
| 2009/0303369 A1 | 12/2009 | Noda et al. | |
| 2010/0208110 A1 | 8/2010 | Kudoh | |
| 2010/0314530 A1 | 12/2010 | Hiyama et al. | |
| 2012/0119270 A1 | 5/2012 | Kimura | |

FOREIGN PATENT DOCUMENTS

| | | |
|---|---|---|
| JP | 2003-046873 A | 2/2003 |
| JP | 2004-304771 A | 10/2004 |
| JP | 2005-277709 A | 10/2005 |
| JP | 2005-348042 A | 12/2005 |
| JP | 2006-067453 A | 3/2006 |
| JP | 2006-174325 A | 6/2006 |
| JP | 2008-034974 A | 2/2008 |
| JP | 2008-048405 A | 2/2008 |

* cited by examiner

FIG. 5

| Gr1 | R1 | Gr | R | Gr | R | Gr | R | Gr | R | Gr | R | Gr | R | Gr | R |
|---|---|---|---|---|---|---|---|---|---|---|---|---|---|---|---|
| B1 | Gb1 | B | Gb | B | Gb | B | Gb | B | Gb | B | Gb | B | Gb | B | Gb |
| Gr2 | R2 | Gr | R | Gr | R | Gr | R | Gr | R | Gr | R | Gr | R | Gr | R |
| B2 | Gb2 | B | Gb | B | Gb | B | Gb | B | Gb | B | Gb | B | Gb | B | Gb |
| Gr3 | R3 | Gr | R | Gr | R | Gr | R | Gr | R | Gr | R | Gr | R | Gr | R |
| B3 | Gb3 | B | Gb | B | Gb | B | Gb | B | Gb | B | Gb | B | Gb | B | Gb |
| Gr4 | R4 | Gr | R | Gr | R | Gr | R | Gr | R | Gr | R | Gr | R | Gr | R |
| B4 | Gb4 | B | Gb | B | Gb | B | Gb | B | Gb | B | Gb | B | Gb | B | Gb |
| Gr5 | R5 | Gr | R | Gr | R | Gr | R | Gr | R | Gr | R | Gr | R | Gr | R |
| B5 | Gb5 | B | Gb | B | Gb | B | Gb | B | Gb | B | Gb | B | Gb | B | Gb |
| Gr6 | R6 | Gr | R | Gr | R | Gr | R | Gr | R | Gr | R | Gr | R | Gr | R |
| B6 | Gb6 | B | Gb | B | Gb | B | Gb | B | Gb | B | Gb | B | Gb | B | Gb |

SOLID-STATE IMAGING APPARATUS, IMAGING SYSTEM AND DRIVING METHOD FOR SOLID-STATE IMAGING APPARATUS

BACKGROUND OF THE INVENTION

1. Field of the Invention

The present invention relates to a solid-state imaging apparatus used for a digital video camera, a digital still camera and an image input apparatus such as an image scanner.

2. Description of the Related Art

In a solid-state imaging apparatus, an increase in speed of readout is requested. There is a technique disclosed in Japanese Patent Application Laid-Open No. 2001-45378 in response to this request. In the technique disclosed in Japanese Patent Application Laid-Open No. 2001-45378, in a pixel array in which plural pixels are arrayed in a matrix form, a signal for driving the pixels is supplied to the pixels in the same row and signals of the pixels are read out via plural column signal lines extending in a direction along columns. Holding units for holding the signals from the pixels are respectively connected to one end and the other end of each of the column signal lines. In parallel to operation for reading out a signal held by one of the two holding units connected to one column signal line, operation for holding a signal output from the pixels in the other holding unit is performed. This can reduce a blanking period, which is a period in which no sensor output is performed, and reduce a readout period.

As another method of realizing an increase in speed of readout, a technique called thinning-out, addition, or averaging, are known. These techniques are often used for an application such as a moving image that is not required of resolution as high as that of a still image. The thinning-out is a technique for forming an image using only signals from pixels in a part of a pixel array. On the other hand, the addition or averaging is a technique for adding or averaging signals from plural pixels. When an increase in speed is realized by the thinning-out, signals are lost and resolution falls. Therefore, when a subject oblique to a matrix of a pixel array is photographed, a step-like image called jaggy may be formed. On the other hand, when the addition or averaging is performed, jaggy can be reduced because signals are not lost. In Japanese Patent Application Laid-Open No. 2004-304771, signals from plural pixels connected to the same column signal line are averaged.

However, in Japanese Patent Application Laid-Open No. 2001-45378, considering that resolution falls when signals are added, the addition or averaging is not examined.

In Japanese Patent Application Laid-Open No. 2004-304771, after signals of pixels to be averaged are held by different capacitors, respectively, the capacitors are electrically connected to read out an averaged signal. An increase in speed of readout is not examined.

SUMMARY OF THE INVENTION

It is an object of the present invention to provide a solid-state imaging apparatus, an imaging system and a driving method for the solid-state imaging apparatus that can reduce jaggy while increasing speed of operation for reading out signals.

According to an aspect of the present invention for attaining the object, there is provided a solid-state imaging apparatus including: a plurality of pixels; a first signal line connected commonly to the plurality of pixels; a read out unit connected to the first signal line; and a control unit for controlling operations of the plurality of pixels and the read out unit, wherein the read out unit has a plurality of first holding units arranged in parallel to each other, and a second holding unit, and the control unit performs a first driving mode including a first step of storing one or more signals from the plurality of pixels in each of the plurality of first holding units; a second step of adding the signals from the plurality of pixels stored in the plurality of first holding units; and a third step of outputting the signal stored in the second holding unit, such that at least a part of a period of the first step is overlapped with a period of the third step.

According to another aspect of the present invention for attaining the object, there is provided a solid-state imaging apparatus including: a plurality of pixels; a first signal line connected commonly to the plurality of pixels; a read out unit connected to the first signal line; and a control unit for controlling operations of the plurality of pixels and the read out unit, wherein the readout unit has a plurality of first holding units connected, to the first signal line, each through each of independently selectable switches, and a second holding unit for storing an addition signal derived by adding signals stored in the plurality of first holding units.

According to still another aspect of the present invention for attaining the object, there is provided a driving method for a solid-state imaging apparatus including: a plurality of pixels; a first signal line connected commonly to the plurality of pixels; and a read out unit connected to the first signal line, wherein the read out unit has a plurality of first holding units arranged in parallel to each other, and a second holding unit, and the driving method includes: a first step of storing one or more signals from the plurality of pixels in each of the plurality of first holding units; a second step of adding the signals from the plurality of pixels stored in the plurality of first holding units; and a third step of outputting the signal stored in the second holding unit, such that at least a part of a period of the first step is overlapped with a period of the third step.

According to the present invention, it is possible to reduce jaggy while increasing speed of operation for reading out signals.

Further features of the present invention will become apparent from the following description of exemplary embodiments with reference to the attached drawings.

BRIEF DESCRIPTION OF THE DRAWINGS

FIG. 5 is a diagram illustrating a schematic configuration example of color filters according to an embodiment of the present invention.

DESCRIPTION OF THE EMBODIMENTS

Exemplary embodiments of the present invention are described below.

In general, averaging of signals and addition of signals can be treated synonymously. In the embodiments described below, averaging and charge addition are distinguished from each other but are generally referred to as addition.

First Embodiment

A first embodiment of the present invention is described with reference to the drawings.

Figure 1:
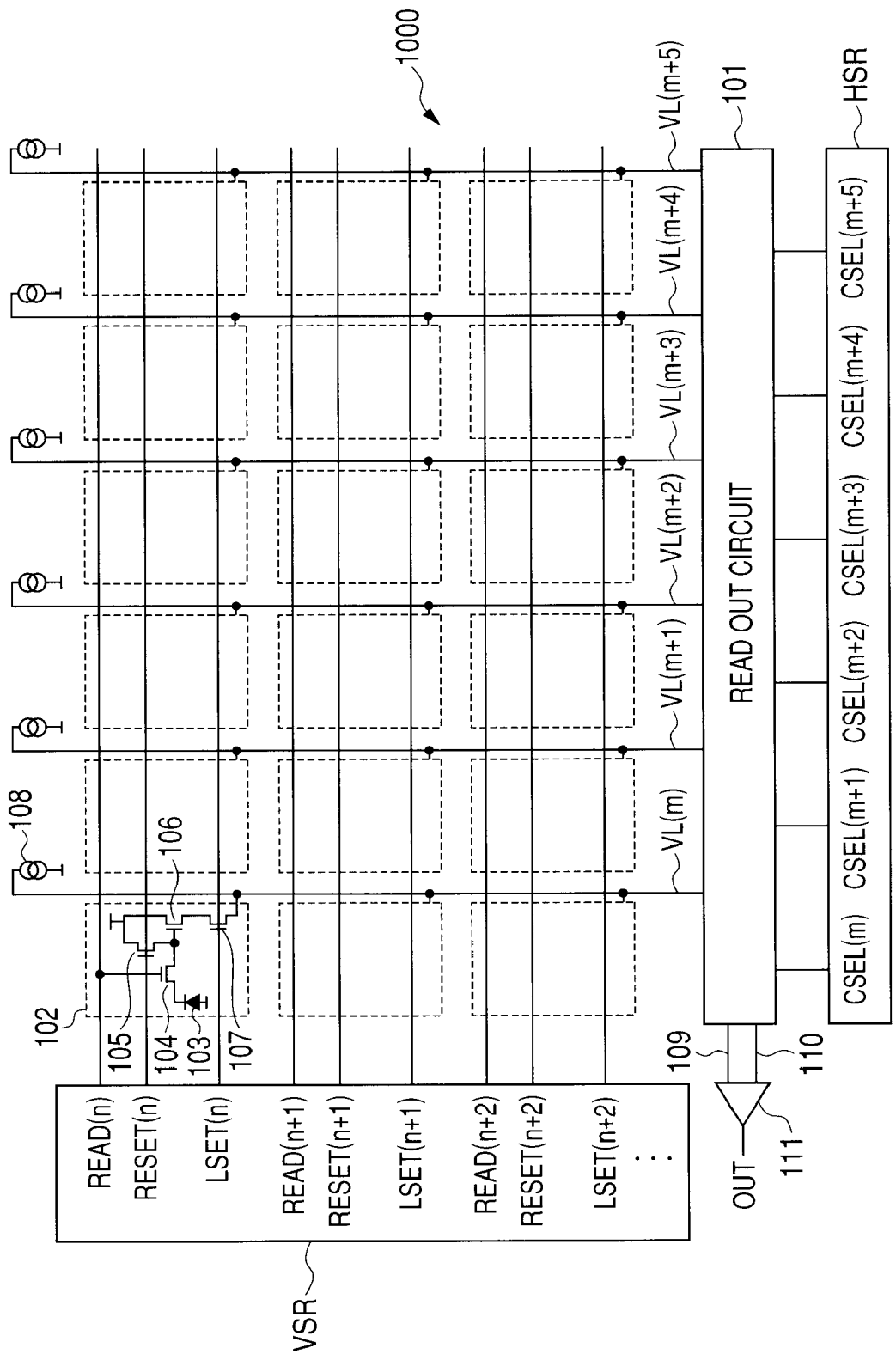
FIG. 1 is a diagram illustrating a schematic configuration example of a solid-state imaging apparatus according to an embodiment of the present invention.

FIG. 1 is a diagram illustrating an extracted section of nth to n+2th rows and mth to m+5th columns in a configuration of a solid-state imaging apparatus according to the first embodiment of the present invention. To simplify the explanation, it is assumed that the solid-state imaging apparatus is a monochrome solid-state imaging apparatus.

A solid-state imaging apparatus 1000 includes a pixel array 100, a read out circuit 101 as a read out unit, and an output unit 111. Each of pixels 102 included in the pixel array 100 includes a photodiode 103, a transfer transistor 104, a reset transistor 105, an amplification transistor 106 and a selection transistor 107. The photodiode 103 as a photoelectric conversion unit generates and accumulates charges corresponding to an incident light amount. The transfer transistor 104 as a transfer unit switches conduction and non-conduction between the photodiode 103 and a gate electrode of the amplification transistor 106 as a pixel output unit. The reset transistor 105 as a reset unit switches conduction and non-conduction between a power supply VDD and a gate terminal of the amplification transistor 106. When the transfer transistor 104 and the reset transistor 105 are simultaneously conductive, the photodiode 103 is reset by the power supply VDD. The amplification transistor 106 forms a source follower circuit together with a constant current source 108 in a period in which the selection transistor 107 as a selecting unit is conductive. A level corresponding to a gate potential of the amplification transistor 106 at that point appears in a vertical output line VL(m) as a first signal line. Signals READ(n), RESET(n) and LSET(n) for controlling the transfer transistor 104, the reset transistor 105 and the selection transistor 107, respectively, are supplied from a vertical scanning circuit VSR as a control unit.

As described in detail later, the read out circuit 101 includes a holding unit that holds, as a signal, a level appearing in the vertical output line VL(m).

Signals held by the holding unit included in the read out circuit 101 are sequentially transmitted to the output unit 111 via horizontal output lines 109 and 110 as second signal lines according to control signals CSEL(m), CSEL(m+1), ... given from a horizontal scanning circuit HSR as a control unit.

The output unit 111 is, for example, a differential amplifier and outputs a difference of the signals, which are output to the horizontal output lines 109 and 110, from an output terminal OUT.

Details of the read out unit 101 are described below with reference to FIG. 2. The following description focuses on a read out circuit connected to the vertical output line VL(m) in an mth column illustrated in FIG. 1.

A node A as an input terminal of the read out circuit 101 is connected to the vertical output line VL(m). First holding capacitors 201 to 203 as first holding units are provided in parallel to one another and connected to the node A via any one of switches 209 to 211, which are selectable independently from one another, and a switch 207. First holding capacitors 204 to 206 as first holding units are provided in parallel to one another and connected to a node B via switches 212 to 214, which are selectable independently from one another, and a switch 208. The node B is a common node for the switch 207 and the switches 209 to 211 and connected to an input terminal of an impedance converter 240 as an impedance converting unit. "The first holding capacitors are provided in parallel to one another" means that the first holding capacitors are in an electrically parallel relation and do not necessarily have to be physically laid out in parallel. When the switches 209 to 211 conduct, one terminals of the first holding capacitors 201 to 203 are electrically connected to the common node B. Since the other terminals of the first holding capacitors 201 to 203 are grounded, when the switches 209 to 211 conduct, the first holding capacitors 201 to 203 are connected in parallel. An actual layout may be any layout. The same holds true for the first holding capacitors 204 to 206. Suppose that capacitance values of the first holding capacitors 201 to 206 are equal. An output terminal of the impedance converter 240 is connected to a holding capacitor 217 as a second holding unit via a switch 242. A node C is a common node for the switch 208 and the switches 212 to 214 and connected to an input terminal of an impedance converter 241. An output terminal of the impedance converter 241 is connected to a holding capacitor 218 as a second holding unit via a switch 243. As a specific configuration of the impedance converters 240 and 241, for example, a source follower circuit, a voltage follower circuit and a differential amplifier described later are conceivable.

When the switches 219 and 220 are turned on according to a signal CSEL(m), signals held by the holding capacitors 217 and 218 are transmitted to the horizontal output lines 109 and 110 via one of nodes D and E as an output terminal of the readout circuit.

Figure 2:
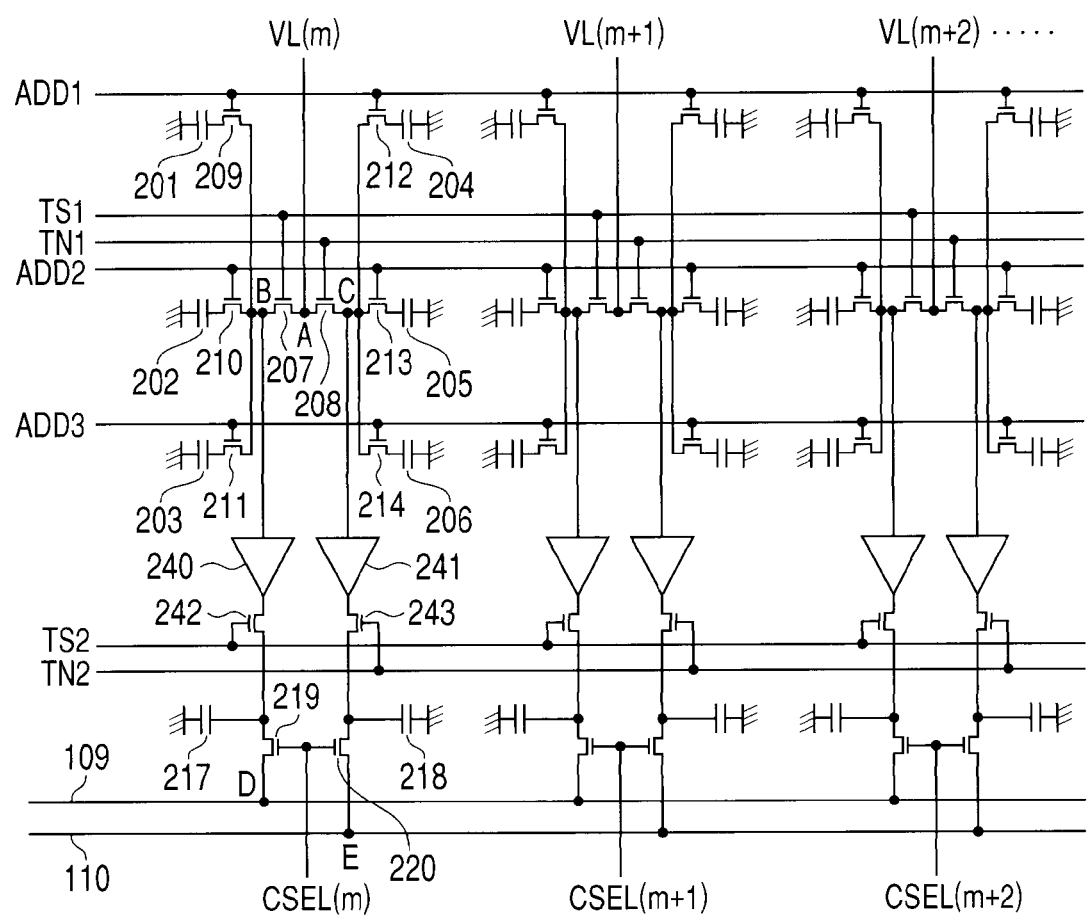
FIG. 2 is a diagram illustrating a configuration example of a read out circuit according to a first embodiment of the present invention.

As illustrated in FIG. 2, when the signal CSEL(m) is supplied, the holding capacitor 217 is electrically connected to the horizontal output line 109 and the holding capacitor 218 is electrically connected to the horizontal output line 110.

When a capacitance value of the holding capacitor 217 is represented as CT and a capacitance value of the horizontal output line 109 is represented as CH, a gain CT/(CT+CH) called a capacitance division ratio is applied to the signal held by the holding capacitor 217. In other words, the signal is transmitted to the output unit 111 with a lower signal level as the capacitance value of the horizontal output line 109 is larger. Therefore, in order to prevent the signal level from falling, it is necessary to set the holding capacitors 217 and 218 to relatively large values. On the other hand, the signals held by the holding capacitors 201 to 206 are transmitted to one of the holding capacitors 217 and 218 via one of the impedance converters 240 and 241. Therefore, compared with the holding capacitors 217 and 218, it is unnecessary to consider the fall in the signal level due to the capacitance division ratio. Capacitance values of the holding capacitors 201 to 206 can be designed to values smaller than those of the holding capacitors 217 and 218.

In FIG. 2, when the switches 209 to 214 are referred to as first connection switches, the switches 242 and 243 are referred to as third connection switches, and the switches 207 and 208 are referred to as fourth connection switches, a connection relation in the read out circuit can be represented as described below. One terminals of the first holding capacitors 201 to 206 are connected to a first signal line VL via the first connection switches 209 to 214 and the fourth connection switches 207 and 208. One terminals of the first holding capacitors 201 to 206 are further connected to the second holding units 217 and 218 via the third connection switches 242 and 243 and connected to one terminals of another set of first holding capacitors via the first connection switches 209 to 214.

Figure 3:
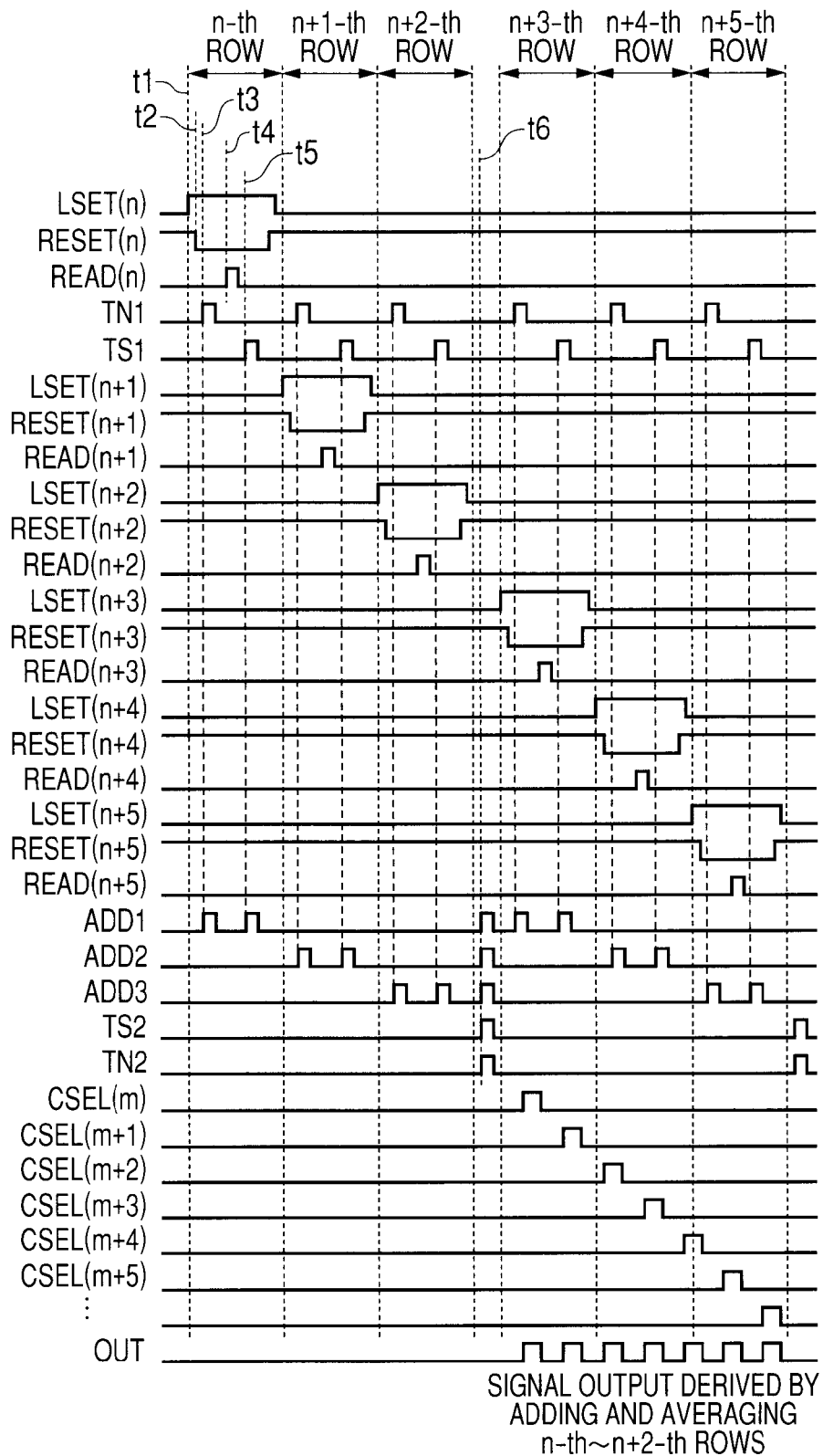
FIG. 3 is a diagram illustrating a driving pattern example in averaging operation according to the first embodiment of the present invention.

Averaging operation according to this embodiment is described with reference to FIG. 3. FIG. 3 is a diagram illustrating a driving pattern example for performing averaging operation.

First, attention is paid to a period "nth row". When a signal LSET(n) changes to a high level at time t1, the selection transistor 107 for pixels in an nth row becomes conductive and a level corresponding to a gate potential of the amplification transistor 106 appears in the vertical output line VL. At time t1, a signal RESET(n) is at the high level and the gate potential of the amplification transistor 106 is in a reset state according to a voltage supplied from the power supply VDD.

When the signal RESET(n) changes to a low level at time t2, the reset state of the gate electrode of the amplification transistor 106 is released. Consequently, the gate electrode of the amplification transistor 106 changes to a floating state.

When a signal TN1 and a signal ADD1 change to the high level in a pulse-like manner from time t3, a level appearing in the vertical output line VL immediately after the gate electrode of the amplification transistor 106 is reset is held by the holding capacitor 204. A signal held by the holding capacitor 204 at this point is treated as a noise signal of pixels.

When a signal READ(n) changes to the high level at time t4, charges accumulated in the photodiode 103 are transferred to the gate electrode of the amplification transistor 106. A gate potential of the amplification transistor 106 fluctuates because of the transferred charges. Consequently, a level appearing in the vertical output line VL also changes. The level appearing in the vertical output line VL at this point is a level obtained by superimposing a signal component due to photoelectric conversion of the photodiode 103 on a noise component at time t3.

When a signal TS1 changes to the high level in a pulse-like manner from time t5, the level of the vertical output line VL corresponding to the change in the gate potential of the amplification transistor 106 is held by the holding capacitor 201. A signal held by the holding capacitor 201 at this point is a signal obtained by superimposing a light signal due to photoelectric conversion in the photodiode in addition to the noise signal of the pixels held by the holding capacitor 204.

The same operation is sequentially performed for a period "n+1th row" and a period "n+2th row". However, in the period "n+1th row", a signal LSET(n+1) and a signal RESET(n+1) are supplied instead of the signal LSET(n) and the signal RESET(n) and a signal ADD2 is supplied instead of the signal ADD1. In the period "n+2th row", a signal LSET(n+2) and a signal RESET(n+2) are supplied instead of the signal LSET(n) and the signal RESET(n) and a signal ADD3 is supplied instead of the signal ADD1.

At time t6 after the end of the period "n+2th row", the signals ADD1 to ADD3, the signal TS2 and the signal TN2 change to the high level. When the signals ADD1 to ADD3 change to the high level, signals based on pixels for three rows held by the holding capacitors 201 to 203 are averaged. At the same time, signals based on pixels for three rows held by the holding capacitors 204 to 206 are also averaged. Since the signal TS2 and the signal TN2 also change to the high level, an averaged signal is transmitted to one of the holding capacitors 217 and 218 via one of the impedance converters 240 and 241. When the signal TS2 and the signal TN2 change to the low level, the signal TS2 and the signal TN2 are held by one of the holding capacitors 217 and 218.

Operation in a period "n+3th row" to a period "n+5th row" is the same as the operation in the period "n+1th row" to the period "n+2th row". In the period "n+3th row" to the period "n+5th row", in parallel to operation for reading out signals from pixels in the n+3th to n+5th rows to the holding capacitors 201 to 206, signals CSEL(m), CSEL(m+1), . . . are sequentially supplied from the horizontal scanning circuit HSR which is the control unit. Consequently, operation for holding signals from pixels in the first holding units and operation for outputting a signal from the second holding unit to one of the horizontal output lines 109 and 110 are performed in parallel. Since the signals read out to the horizontal output lines 109 and 110 are subjected to subtraction processing in the output unit 110 and output from the terminal OUT, noise components are reduced. Therefore, an S/N ratio of a signal obtained from the solid-state imaging apparatus is improved. The differential amplifier included in the output unit 111 may be a differential amplifier that can variably adjust a gain.

Subsequently, the same operation is also performed. Specifically, for example, in a period "n+6" to a period "n+8", operation for reading out signals from pixels in n+6th to n+8th rows to the holding capacitors 201 to 206 is performed. In parallel to this operation, a signal corresponding to averaging of signals from pixels in n+3th to n+5th rows held by the second holding unit is read out to a horizontal output line.

The operation described above can be mainly classified into three steps. A first step is a step of holding signals from pixels in the first holding capacitors. A second step is a step of transmitting a signal obtained by averaging the signals held by the plural first holding capacitors, i.e., an addition signal, to the second holding capacitors. A third step is a step of outputting the addition signal held by the second holding capacitors to the horizontal output line. At least parts of the first step and the third step are performed in parallel.

According to the present embodiment, a blanking period can be reduced by performing, in parallel, the operation for reading out signals from pixels to the first holding units and the operation for reading out a signal held by the second holding unit to the horizontal output line as described above. Moreover, since signals from plural pixels extending over plural rows are averaged, it is possible to reduce jaggy in addition to improving a frame rate. The embodiment described above can be suitably used in photographing of a moving image.

Figure 4:
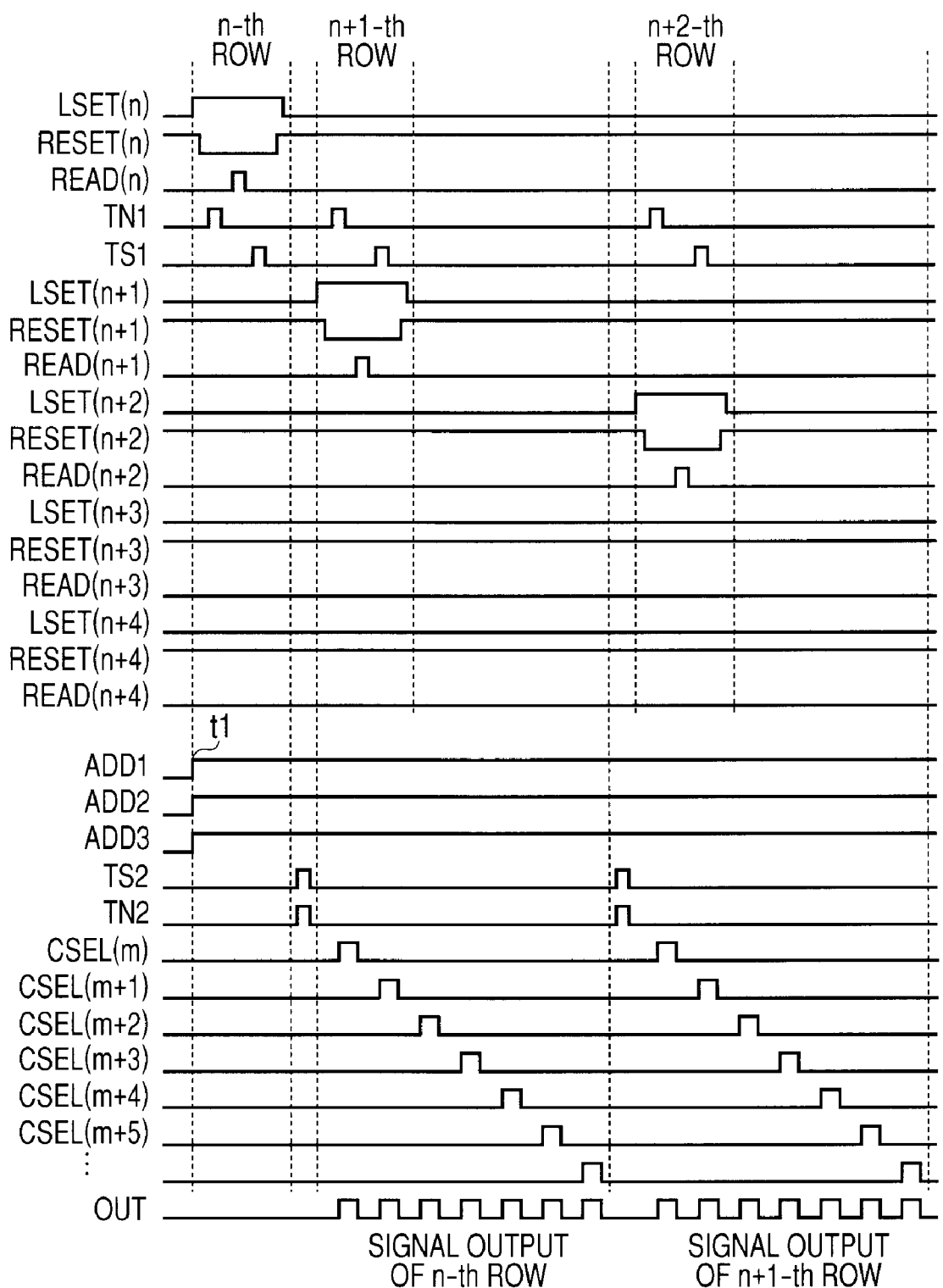
FIG. 4 is a diagram illustrating a driving pattern example in all pixel readout according to the first embodiment of the present invention.

A driving pattern example in so-called all pixel readout for sequentially reading out signals from one pixel at a time without averaging signals from plural pixels using the circuit illustrated in FIG. 2 is illustrated in FIG. 4.

The driving pattern example is substantially different from the driving pattern example illustrated in FIG. 3 in that the signals ADD1 to ADD3 are fixed at the high level. Consequently, the holding capacitors 201 to 203 are connected in parallel to one another and the holding capacitors 204 to 206 are connected in parallel to one another. This enables an increase in the capacitance of the first holding capacitors for sampling and holding signals from pixels.

In general, when a signal is held in a capacitor or switching operation is performed in order to read out the signal held in the capacitor, noise called kTC noise occurs and affects the signal. The level of the kTC noise is represented as $\sqrt{(kT/C)}$, where k is a Boltzmann constant, T is temperature, and C is a capacitance value. Since the level of the kTC noise is inversely proportional to a square root of capacitance C, it is possible to reduce the influence of the kTC noise by connecting plural first holding capacitors in parallel to increase a capacitance value thereof. In this embodiment, the plural first holding capacitors are provided to average signals from plural pixels. Therefore, when signals are sequentially read out from one pixel at a time, it is desirable to connect plural first capacitors in parallel. The operation for sequentially reading out signals from one pixel at a time is used for an application such as still image photographing required of a high image quality, although not required of a very high frame rate. Therefore, a merit obtained by reducing the influence of the kTC noise is large.

In a driving pattern example illustrated in FIG. 4, after signals from pixels in the nth row are read out to the first holding capacitors 201 to 206, the signal TS2 and the signal TN2 change to the high level before signals from pixels in the n+1th row are read out to the first holding capacitors 201 to 206. In parallel to operation for reading out signals from pixels in the n+1th row to the first holding capacitors 201 to 206 in the period "n+1th row", operation for reading out signals held by the second holding capacitors 217 and 218 to the horizontal output line is performed. The same operation is repeated in the period "n+2th row" and subsequent periods.

With the averaging operation set as a first driving mode and the all pixel readout operation set as a second driving mode, it is possible to switch the driving modes to each other with the vertical scanning circuit VSR and the horizontal scanning circuit HSR as control units.

This embodiment is described above as the monochrome solid-state imaging apparatus, but can be also applied to a solid-state imaging apparatus including color filters. As a representative array of color filters, there is a Bayer color array. FIG. 5 is a diagram illustrating an array of color filters of the Bayer color array. With four pixels of 2 rows×2 columns set as a unit, G (Green) pixels (Gr, Gb) are diagonally arranged and an R (Red) pixel (R) and a B (Blue) pixel (B) are diagonally arranged in each unit. In the figure, pixels affixed with the same suffix such as Gr1, Gb1, R1 and B1 form a unit.

When signals are added or averaged in a solid-state imaging apparatus including color filters of the Bayer color array, it is a normal practice to add or average signals of pixels in which filers of the same color are arranged. As it is evident from FIG. 5, since pixels of the same color are arranged every other pixel in the Bayer color array, it is necessary to select pixels every other row in order to add signals from pixels in different rows in the same column. Therefore, whereas pixels are sequentially selected from the nth row at the timing illustrated in FIG. 3, pixels are selected every other row, i.e., the nth row, the n+2th row, the n+4th row, . . . in the solid-state imaging apparatus including the color filters. Alternatively, it is also possible to perform the operation in the period "nth row" to "n+2th row" illustrated in FIG. 3 in the same manner as the monochrome solid-state imaging apparatus and selectively supply the signals ADD1 to ADD3 at time t6 such that only signals from pixels of the same color are averaged.

According to this embodiment, averaging in the vertical direction is performed by the first holding capacitors and jaggy can be prevented. At least parts of the first step of causing the first holding capacitors to hold signals from pixels and the third step of outputting the signals held by the second holding capacitors to the horizontal output line are performed in parallel. This enables to quickly read out signals from plural pixels in the same column while adding the signals. Therefore, it is possible to improve a frame rate while preventing jaggy.

Modification of the First Embodiment

The configuration of the read out circuit described in the first embodiment is not limited to that illustrate in FIG. 2. Various variations are conceivable.

A modification of the first embodiment is described with reference to FIG. 18. A circuit configuration of the modification is different from the circuit configuration illustrated in FIG. 2 in a configuration from the vertical output line VL to an input terminal of an impedance converter.

Figure 18:
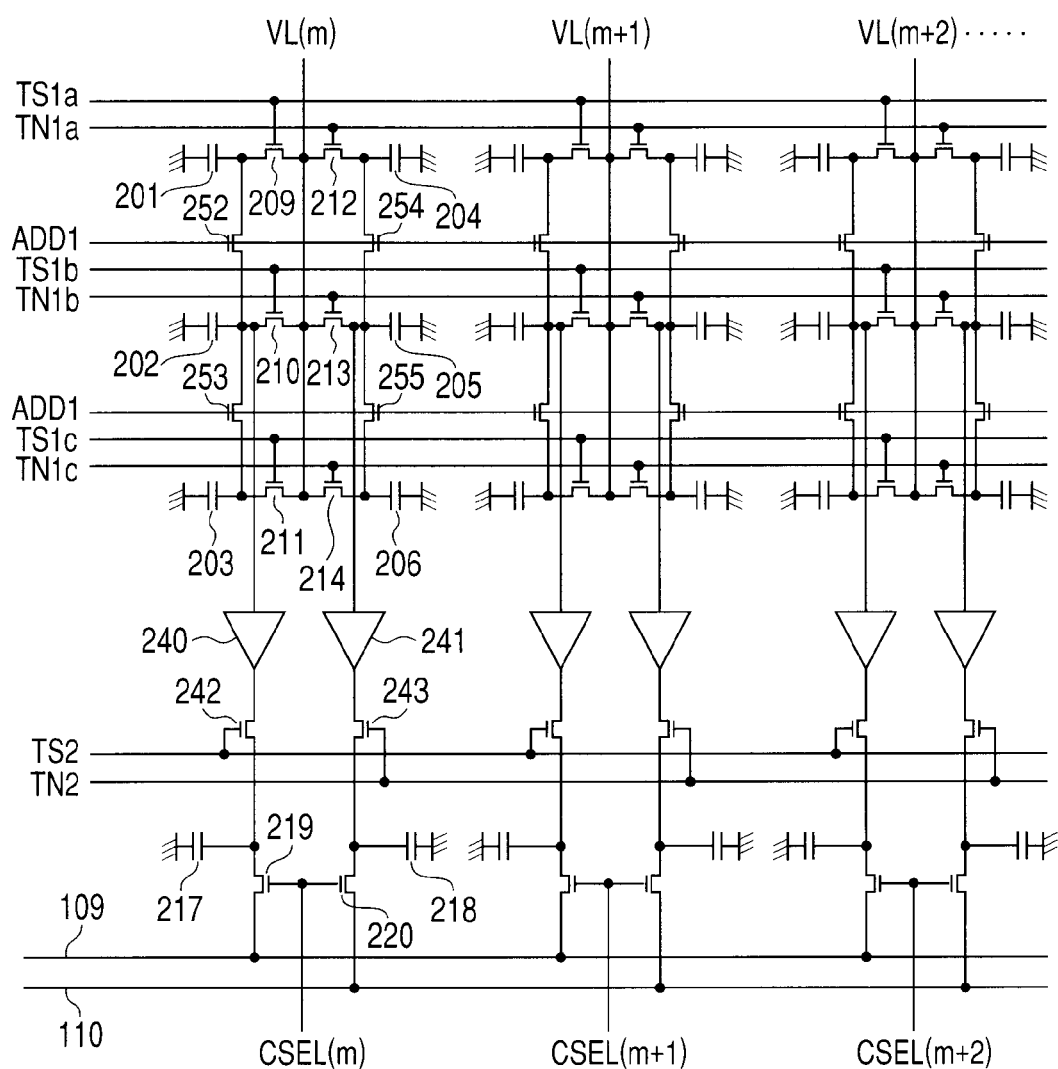
FIG. 18 is a diagram illustrating a configuration example of a read out circuit according to a modification of the first embodiment of the present invention.

In FIG. 18, each of the first holding capacitors 201 to 206 is connected to the vertical output line VL(m) via any one of the switches 209 to 214. The switches 209 to 214 are respectively controlled according to separate signals TS1a to TS1c and TN1a to TN1c. The switches 209 to 214 are connected to the first holding capacitors 201 and 202 via a switch 252 controlled according to the signal ADD1. The switches 209 to 214 are connected to the first holding capacitors 202 and 203 via a switch 253 controlled according to the signal ADD2. The switches 209 to 214 are connected to the first holding capacitors 204 and 205 via the switch 253 controlled according to the signal ADD1. Further, the switches 209 to 214 are connected to the first holding capacitors 205 and 206 via a switch 254 controlled according to the signal ADD2.

In FIG. 18, when the switches 209 to 214 are referred to as first connection switches, the switches 252 to 255 are referred to as second connection switches, and the switches 242 and 243 are referred to as third connection switches, a connection relation in the read out circuit can also be represented as described below. One terminals of the first holding capacitors 201 to 206 are connected to the first signal line VL via the first connection switches 209 to 214 and connected to one terminals of another set of first holding capacitors 201 to 206 via the second connection switches 252 to 255. Further, one terminals of the first holding capacitors 201 to 206 are connected to the second holding capacitors 217 and 218 via the third connection switches 242 and 243.

Figure 19:
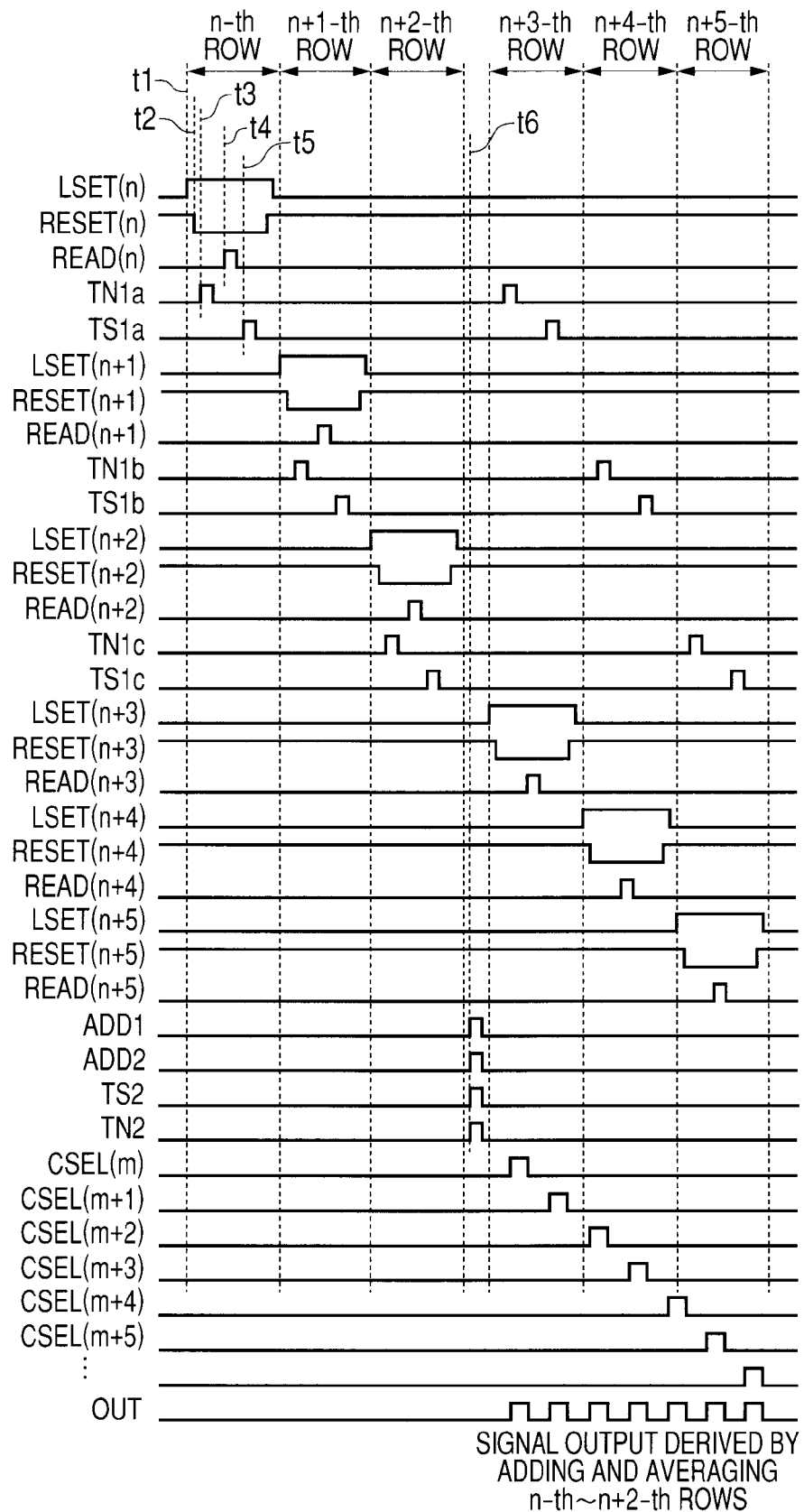
FIG. 19 is a diagram illustrating a driving pattern example in averaging operation according to the modification of the first embodiment of the present invention.

A driving pattern example in the case in which averaging operation is performed by using the read out circuit illustrated in FIG. 18 is illustrated in FIG. 19.

First, attention is paid to a period "nth row". When a signal LSET(n) changes to a high level at time t1, the selection transistor 107 for pixels in an nth row becomes conductive and a level corresponding to a gate potential of the amplification transistor 106 appears in the vertical output line VL. At time t1, a signal RESET(n) is at the high level and the gate potential of the amplification transistor 106 is in a reset state according to a voltage supplied from the power supply VDD.

When the signal RESET(n) changes to a low level at time t2, the reset state of the gate electrode of the amplification transistor 106 is released. Consequently, the gate electrode of the amplification transistor 106 changes to a floating state.

When a signal TN1a changes to the high level in a pulse-like manner from time t3, a level appearing in the vertical output line VL immediately after the gate electrode of the amplification transistor 106 is reset is held by the holding capacitor 204. A signal held by the holding capacitor 204 at this point is treated as a noise signal of pixels.

When a signal READ(n) changes to the high level at time t4, charges accumulated in the photodiode 103 are transferred to the gate electrode of the amplification transistor 106. A gate potential of the amplification transistor 106 fluctuates because of the transferred charges. Consequently, a level appearing in the vertical output line VL also changes.

When a signal TS1a changes to the high level in a pulse-like manner from time t5, the level of the vertical output line VL corresponding to the change in the gate potential of the amplification transistor 106 is held by the holding capacitor 201. A signal held by the holding capacitor 201 at this point is a signal obtained by superimposing a light signal due to photoelectric conversion in the photodiode in addition to the noise signal of the pixels held by the holding capacitor 204.

The same operation is repeated for a period "n+1th row" and a period "n+2th row". However, in the period "n+1th row", a signal LSET(n+1) and a signal RESET(n+1) are supplied instead of the signal LSET(n) and the signal RESET(n) and signals TN1b and TS1b are supplied instead of the signals TN1a and TS1a. In the period "n+2th row", a signal LSET(n+2) and a signal RESET(n+2) are supplied instead of the signal LSET(n) and the signal RESET(n) and signals TN1c and TS1c are supplied instead of the signals TN1a and TS1a.

At time t6 after the end of the period "n+2th row", the signals ADD1 and ADD2, the signal TS2 and the signal TN2 change to the high level. When the signals ADD1 and ADD2 change to the high level, signals based on pixels for three rows held by the holding capacitors 201 to 203 are averaged. At the same time, signals based on pixels for three rows held by the holding capacitors 204 to 206 are also averaged. Since the signal TS2 and the signal TN2 also change to the high level, an averaged signal is transmitted to one of the holding capacitors 217 and 218 via one of the impedance converters 240 and 241. When the signal TS2 and the signal TN2 change to the low level, the signal TS2 and the signal TN2 are held by one of the holding capacitors 217 and 218.

Operation in a period "n+3th row" to a period "n+5th row" is the same as the operation in the period "n+1th row" to the period "n+2th row". In the period "n+3th row" to the period "n+5th row", in parallel to operation for reading out signals from pixels in the n+3th to n+5th rows to the holding capacitors 201 to 206, signals CSEL(m), CSEL(m+1), . . . are sequentially supplied from the horizontal scanning circuit HSR as the control unit. Consequently, operation for holding signals from pixels in the first holding units and operation for outputting a signal from the second holding unit to one of the horizontal output lines 109 and 110 are performed in parallel. Since the signal read out to one of the horizontal output lines 109 and 110 is subjected to subtraction processing in the output unit 110 and output from the terminal OUT, noise components are reduced. Therefore, an S/N ratio of a signal obtained from the solid-state imaging apparatus is improved. The differential amplifier included in the output unit 111 may be a differential amplifier that can variably adjust a gain.

As described above, according to the modification of the first embodiment, averaging in the vertical direction is performed by the first holding capacitors and jaggy can be prevented. At least parts of the first step of causing the first holding capacitors to hold signals from pixels and the third step of outputting the signals held by the second holding capacitors to the horizontal output line are performed in parallel. This enables to quickly read out signals from plural pixels in the same column while adding the signals. Therefore, it is possible to improve a frame rate while preventing jaggy.

Figure 20:
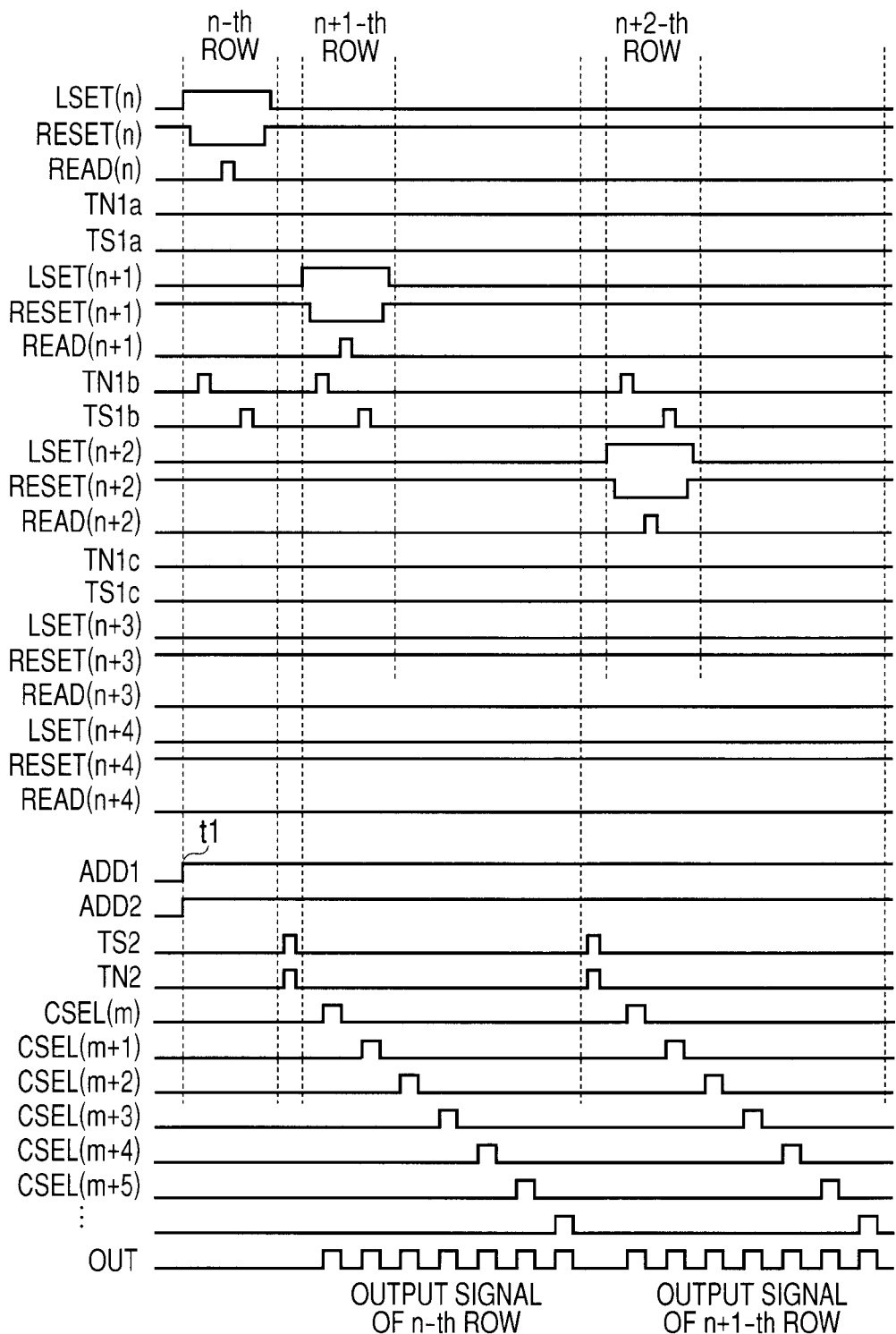
FIG. 20 is a diagram illustrating a driving pattern in all pixel readout according to the modification of the first embodiment of the present invention.

A driving pattern example for performing all pixel readout using the read out circuit illustrated in FIG. 18 is illustrated in FIG. 20.

Since operation illustrated in FIG. 20 is similar to the driving pattern example illustrated in FIG. 4, detailed description of the operation is omitted. However, the averaging operation and the all pixel readout can also be switched by using the read out circuit illustrated in FIG. 18.

(Second Embodiment)

Next, a second embodiment of the present invention is described. In the first embodiment, it is assumed that capacitance values of the first holding capacitors 201 to 206 are equal. Therefore, three pixels to be averaged are treated equally. In the second embodiment, a configuration for performing averaging with weighting taken into account is described.

Figure 6:
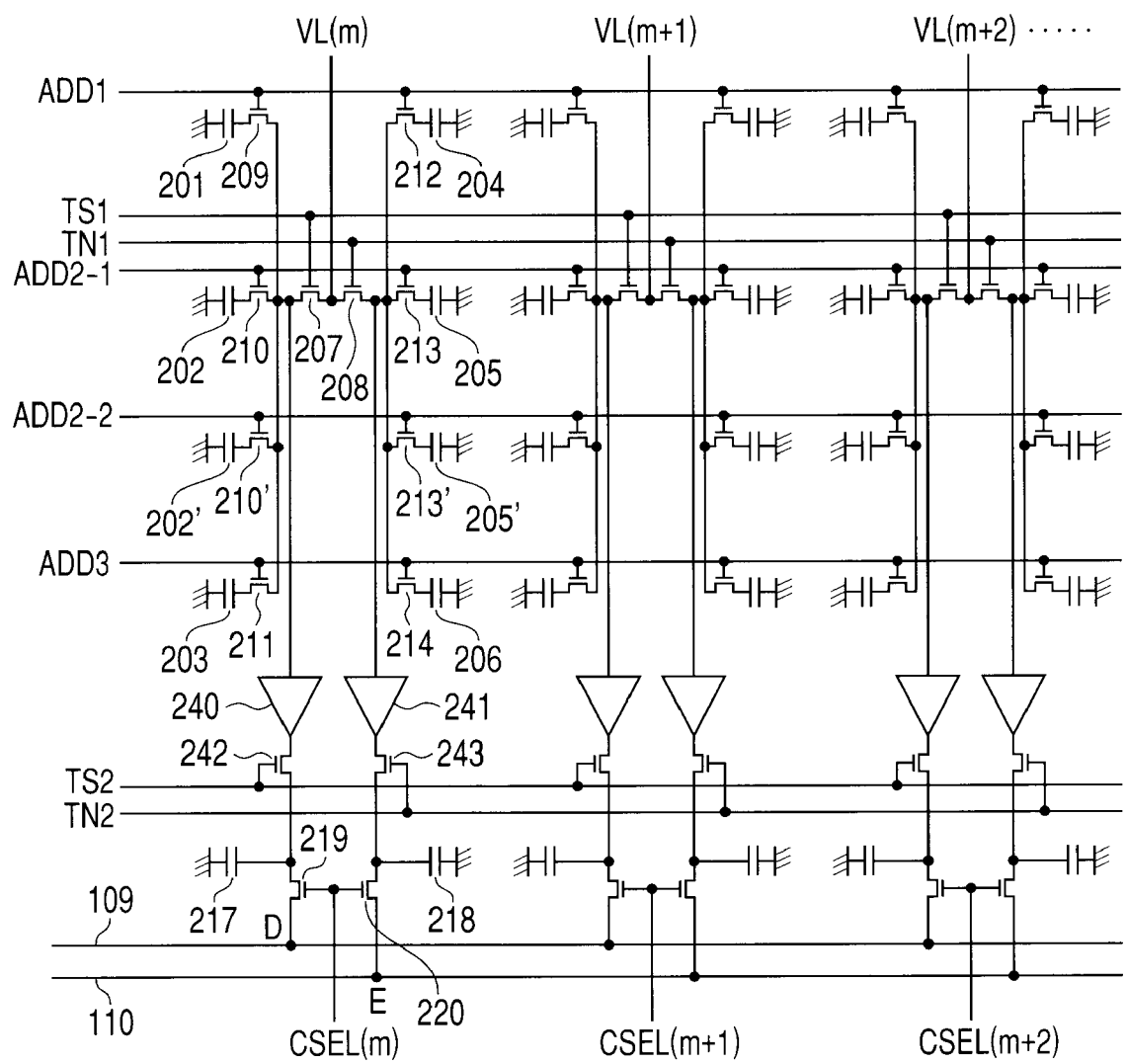
FIG. 6 is a diagram illustrating a schematic configuration example of a read out circuit according to a second embodiment of the present invention.

FIG. 6 is schematic representation of a configuration of a read out circuit according to this embodiment. The read out circuit is different from the read out circuit illustrated in FIG. 2 in that third holding capacitors 202' and 205' are added as third holding units. It is assumed that capacitance values of the first holding capacitors 201 to 206 excluding the holding capacitors 202' and 205' are equal. Capacitance values of the holding capacitors 202' and 205' may be equal to or may be different from the capacitance values of the holding capacitors 201 to 206. The holding capacitor 202 is connected to the node B via a switch 210 and the holding capacitor 205 is connected to the node C via a switch 212. The switches 210 and 212 are controlled according to a signal ADD2-1. The holding capacitor 202' is connected to the node B via a switch 210' and the holding capacitor 205' is connected to the node C via a switch 212'. The switches 210' and 212' are controlled according to a signal ADD2-2.

As operation, operation same as the operation illustrated in FIG. 3 in the first embodiment is performed. However, the signal ADD2 illustrated in FIG. 3 is read as the signal ADD2-1 in this embodiment. The signal ADD2-2 is changed to the high level at timing for holding signals from pixels regarded as important in performing the averaging processing. For example, when information concerning pixels in a second row among pixels in three rows is regarded more important than pixels in the other two rows, the pixels are driven at timing same as that for the signal ADD2 illustrated in FIG. 3. If capacitance values of the holding capacitors 202' and 205' are equal to the capacitance values of the holding capacitors 201 to 206, signals from pixels in the first to third rows are combined with weighing of 1:2:1 taken into account.

Such weighted averaging processing is particularly effective in a pixel configuration in which color filters are provided. For example, the color filters of the Bayer color array illustrated in FIG. 4 are provided. When signals from Gr1, Gr2 and Gr3 are averaged at a ratio of 1:1:1, a center of gravity after the averaging is in a position of Gr2. However, since information for these three pixels is read out as a signal of one pixel, the resolution of an obtained image falls. On the other hand, it is possible to average the signals with weighting of Gr1, Gr2 and Gr3 set to 1:2:1 using the read out circuit illustrated in FIG. 6. This enables to prevent the fall in resolution, although the center of gravity after the averaging is in the position of Gr2. This method is a method generally called "low-pass filtering". In this embodiment, it is possible to improve an image quality and read out signals at high speed by using the method of low-pass filtering.

As described above, capacitance values of the third holding capacitors 202' and 205' may be equal to or may be different from the capacitance values of the holding capacitors 201 to 206. Therefore, it is possible to determine a ratio of weighting by designing capacitance values of the holding capacitors 202' and 205' according to an application or a purpose.

When the operation for sequentially reading out signals from one pixel at a time using the circuit illustrated in FIG. 6, the pixels may be driven at the timing illustrated in FIG. 4. However, ADD2 illustrated in FIG. 4 is read as the signal ADD2-1. The signal ADD2-2 may be supplied at timing same as that for the signals ADD1, 2-1 and 3 or may be always off. However, in reducing the kTC noise as described above, it is advantageous to supply the signal ADD2-2 at timing same as that for the signals ADD1, 2-1 and 3.

According to this embodiment, averaging in the vertical direction is performed by the first holding capacitors and jaggy can be prevented. At least parts of the first step of causing the first holding capacitors to hold signals from pixels and the third step of outputting the signals held by the second holding capacitors to the horizontal output line are performed in parallel. This enables to quickly read out signals from plural pixels in the same column while adding the signals. Therefore, it is possible to improve a frame rate while preventing jaggy.

(Third Embodiment)

A third embodiment of the present invention is described with reference to FIG. 7.

Figure 7:
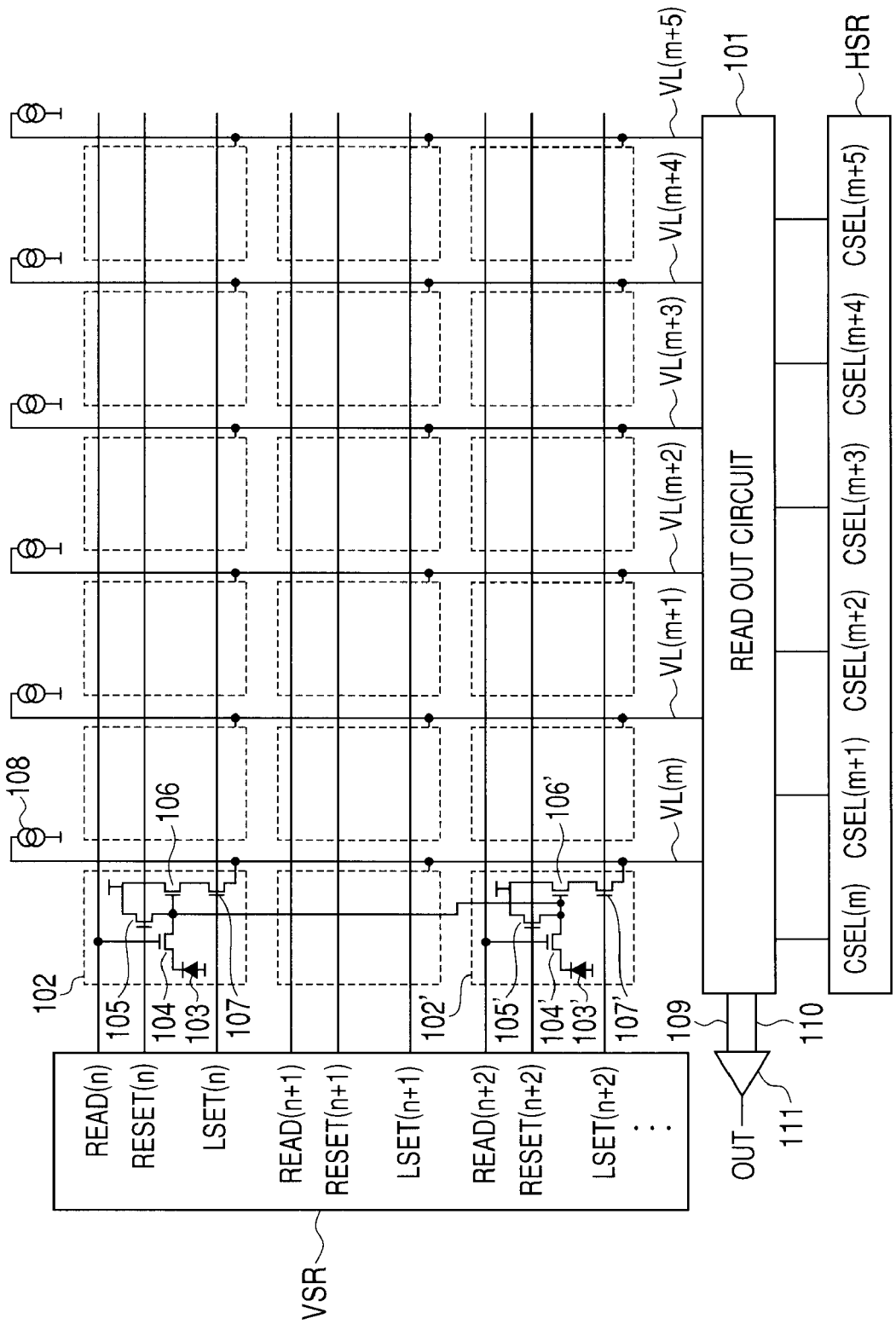
FIG. 7 is a diagram illustrating a schematic configuration example of a solid-state imaging apparatus according to a third embodiment of the present invention.

FIG. 7 is a schematic diagram illustrating a configuration of a solid-state imaging apparatus according to this embodiment. It is assumed that the color filters of the Bayer color array illustrated in FIG. 5 are provided. The configuration is different from the configuration illustrated in FIG. 1 in that gate terminals of amplification transistors 106 and 106' of the pixel 102 in the nth row and the pixel 102' in the n+2th row are electrically short-circuited. Although not illustrated in the figure, gate terminals are connected in the same manner for the n+1th row and the n+3th row. The same configuration is repeated in the n+4th row and subsequent rows not illustrated in the figure. A read out circuit is that illustrated in FIG. 2.

Figure 8:
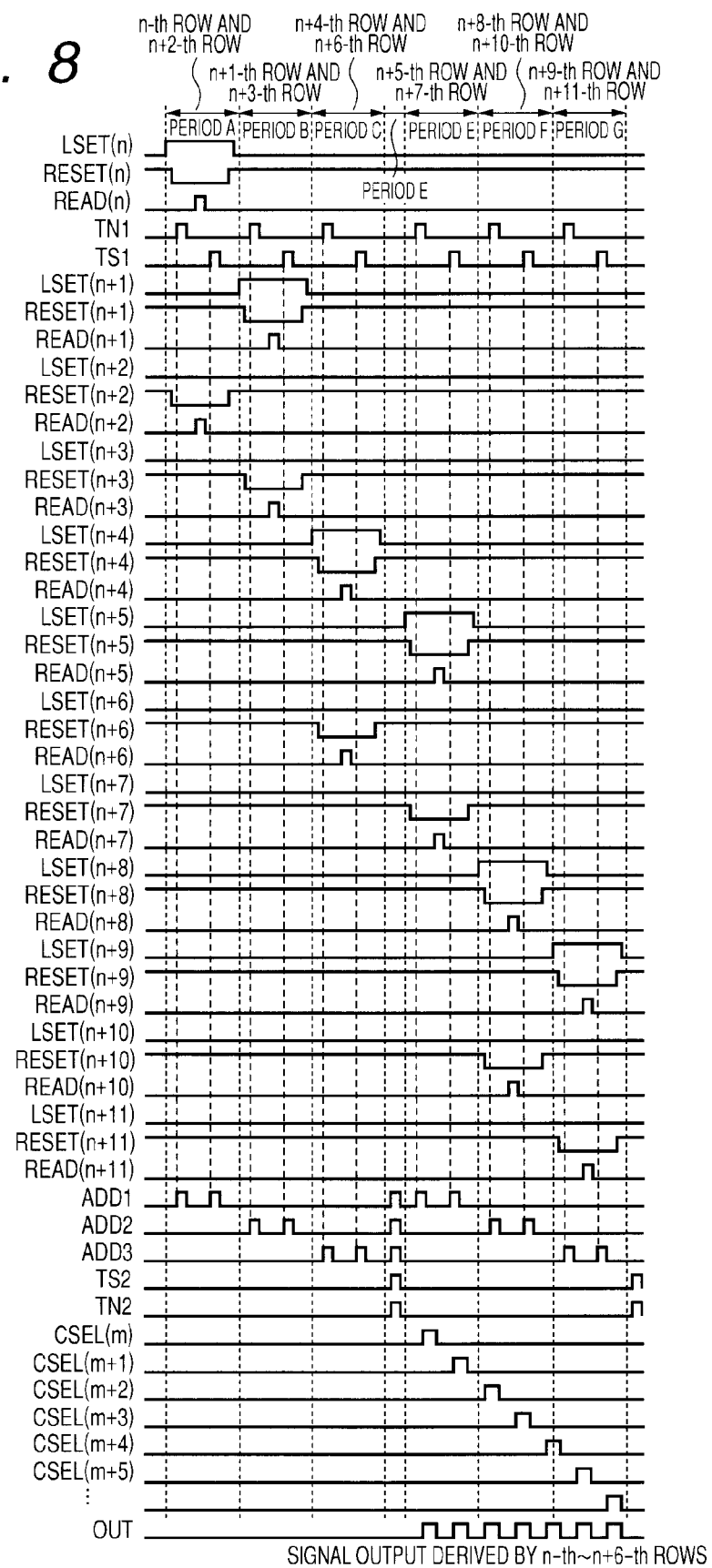
FIG. 8 is a diagram illustrating a driving pattern example in averaging operation according to the third embodiment of the present invention.

FIG. 8 is a diagram illustrating a driving timing example of averaging operation according to this embodiment. Differences from the driving timing illustrated in FIG. 3 are mainly described. In a period A illustrated in FIG. 8, signals RESET (n) and RESET(n+2) and signals READ(n) and READ(n+2) are supplied at the same timing. Consequently, charges accumulated in photodiodes 103 and 103' are subjected to charge addition in a common node in which gate terminals of the amplification transistors 106 and 106' are electrically short-circuited. When the signals TN1 and TS1 change to a high level in a pulse-like manner in the period A, noise signals and light signals for two pixels in the nth row and the n+2th row are held by the first holding capacitors 211 and 209.

In the following period B and C, signals for two pixels are subjected to charge addition and held by the first holding capacitors. When the signals ADD1 to ADD3, TS2 and TN2 are supplied in a period D, signals from pixels for six rows in total held by the first holding capacitors until the end of the period C are averaged and then transmitted to the second holding capacitors.

In periods E to G, operation same as the operation in the periods A to C is applied to pixels in n+5th to n+11th rows. Operation for outputting the signals held by the second holding unit to the horizontal output line is performed in parallel.

It is possible to add the signals from the pixels for six rows in total by subjecting the signals of the pixels for two rows to charge addition in the pixel unit and averaging the signals from the pixels for 2×3 rows in the first holding units in this way. Further, at least parts of the first step of causing the first holding capacitors to hold signals from pixels and the third step of outputting the signals held by the second holding capacitors to the horizontal output line are performed in parallel. This enables to quickly read out signals from plural pixels in the same column while adding the signals. Therefore, it is possible to improve a frame rate while preventing jaggy.

When the operation for sequentially reading out signals from one pixel at a time is performed, the pixels may be driven at the timing illustrated in FIG. 4.

In the example described above, the signals of the pixels for two rows are subjected to charge addition in the pixels and averaged in the first holding units. However, the number of pixels that add signals is not limited. The number can be arbitrarily designed according to an application or a purpose. As a variation, it is also possible to adopt a configuration for electrically short-circuiting gate terminals of amplification transistors of pixels in the same row in different columns to thereby perform charge addition in the horizontal direction in the pixels and perform averaging in the vertical direction in the first holding units.

According to this embodiment, averaging in the vertical direction is performed by the first holding capacitors and jaggy can be prevented. At least parts of the first step of causing the first holding capacitors to hold signals from pixels and the third step of outputting the signals held by the second holding capacitors to the horizontal output line are performed in parallel. This enables to quickly read out signals from plural pixels in the same column while adding the signals. Therefore, it is possible to improve a frame rate while preventing jaggy.

(Fourth Embodiment)

A fourth embodiment of the present invention is described with reference to FIGS. 9 and 10. In this embodiment, it is possible to average, in the horizontal direction, signals held by the second holding capacitors.

Figure 9:
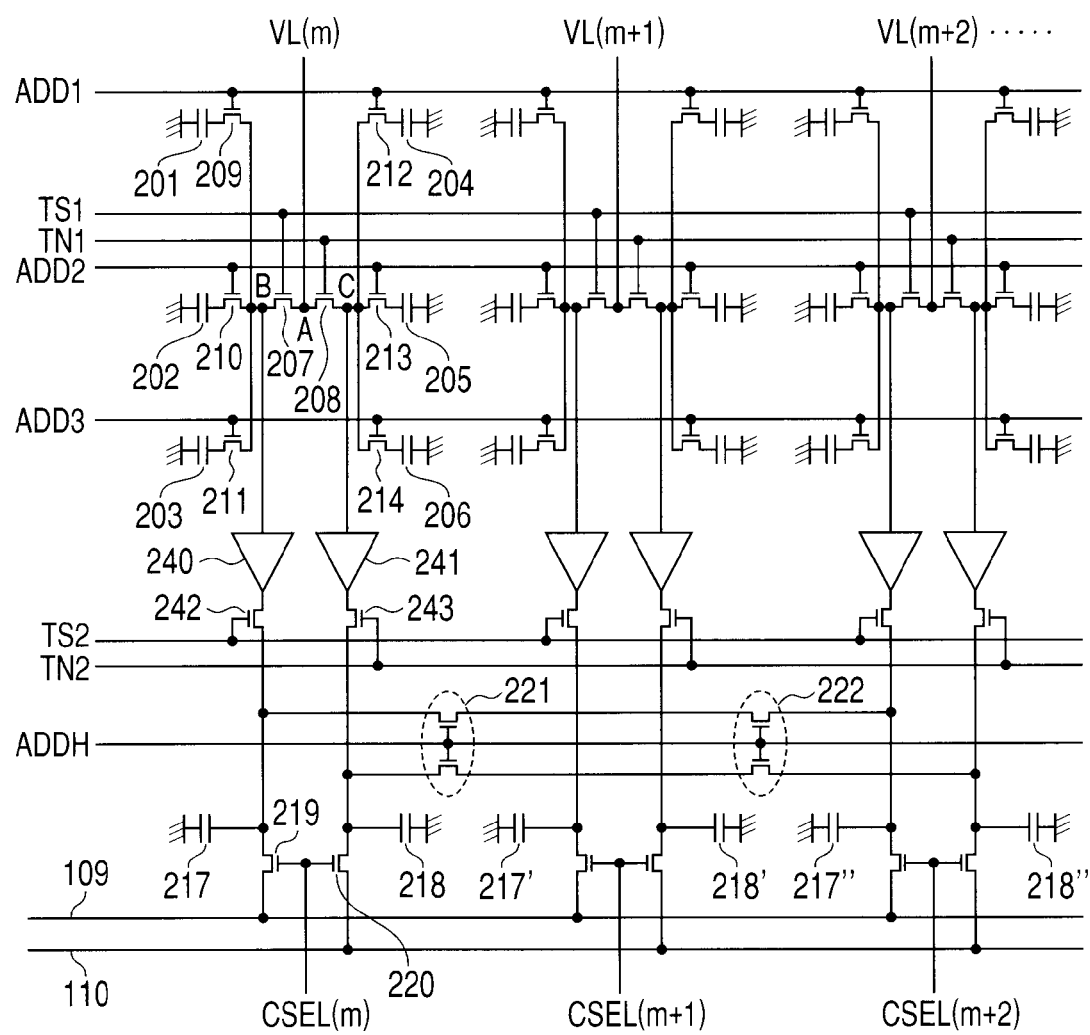
FIG. 9 is a diagram illustrating a schematic configuration example of a read out circuit according to a fourth embodiment of the present invention of the present invention.

FIG. 9 is a schematic diagram of a read out circuit according to this embodiment. Pixels connected to the vertical output lines VL are those illustrated in FIG. 1. A solid-state imaging apparatus according to this embodiment is a monochrome solid-state imaging apparatus. A configuration of the solid-state imaging apparatus is different from the configuration illustrated in FIG. 2 in that switches 221 and 222 for short-circuiting, in parallel, second holding capacitors provided in different columns are added. The switch 221 includes two transistors. One of the transistors can short-circuit second holding capacitors 217 and 217' and the other can short-circuit second holding capacitors 218 and 218'. The switch 222 includes two transistors. One of the transistors can short-circuit second holding capacitors 217' and 217" and the other can short-circuit second holding capacitors 218' and 218". Conduction and non-conduction of the transistors included in the switches 221 and 222 are switched according to a common signal ADDH.

Figure 10:
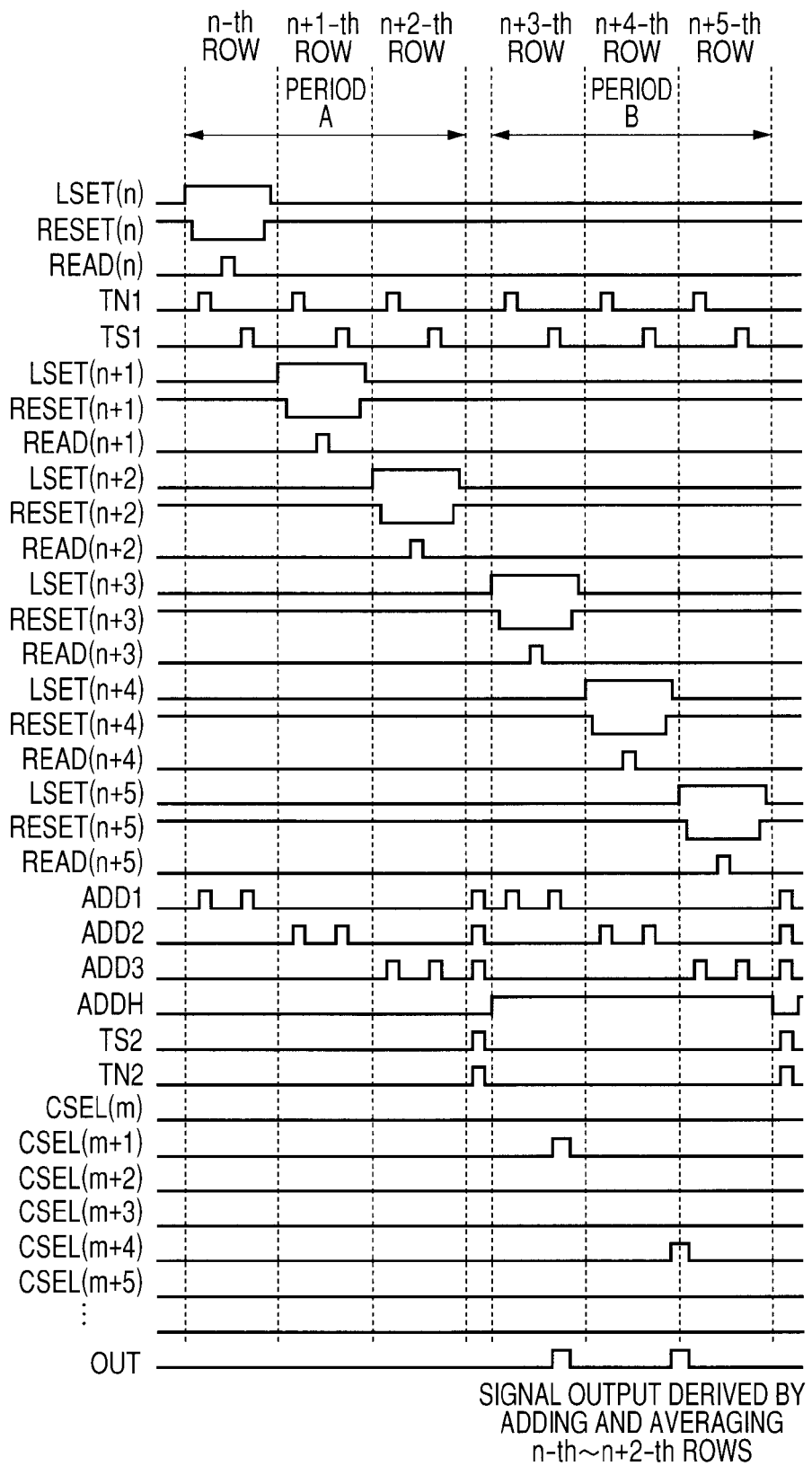
FIG. 10 is a diagram illustrating a driving pattern example in averaging operation according to the fourth embodiment of the present invention.

An example of driving timing for the read out circuit illustrated in FIG. 9 is illustrated in FIG. 10. In FIG. 10, the driving timing is different from the timing illustrated in FIG. 3 in that the signal ADDH is maintained at the high level during a period indicated as the period B. This enables to average signals held by the second holding capacitors 217, 217' and 217" and average signals held by the second holding capacitors 218, 218' and 218". At the driving timing illustrated in FIG. 3, the signals CSEL(m), CSEL(m+1), . . . are sequentially supplied. However, in this embodiment, since second holding capacitors in three columns adjacent to one another are short-circuited, any one of the signals CSEL(m) to CSEL(m+2) only has to be supplied. In the example illustrated in FIG. 10, the CSEL(m+1) is supplied. However, one of the signals CSEL(m) and CSEL(m+2) may be supplied instead of the signal CSEL(m+1). The same holds true for signals CSEL(m+3) to CSEL(m+5).

In the color solid-state imaging apparatus including the color filters of the Bayer color array illustrated in FIG. 4, it is a normal practice to add signals from pixels of the same color. Therefore, it is appropriate to connect the second holding capacitors every other column rather than connecting the second holding capacitors in the adjacent columns.

According to this embodiment, averaging in the vertical direction is performed by the first holding capacitors, averaging in the horizontal direction is performed by the second holding capacitors and jaggy can be prevented. At least parts of the first step of causing the first holding capacitors to hold signals from pixels and the third step of outputting the signals held by the second holding capacitors to the horizontal output line are performed in parallel. This enables to quickly read out signals from plural pixels in the same column while adding the signals. Therefore, it is possible to improve a frame rate while preventing jaggy.

(Fifth Embodiment)

A fifth embodiment of the present invention is described with reference to FIGS. 11 and 12.

Figure 11:
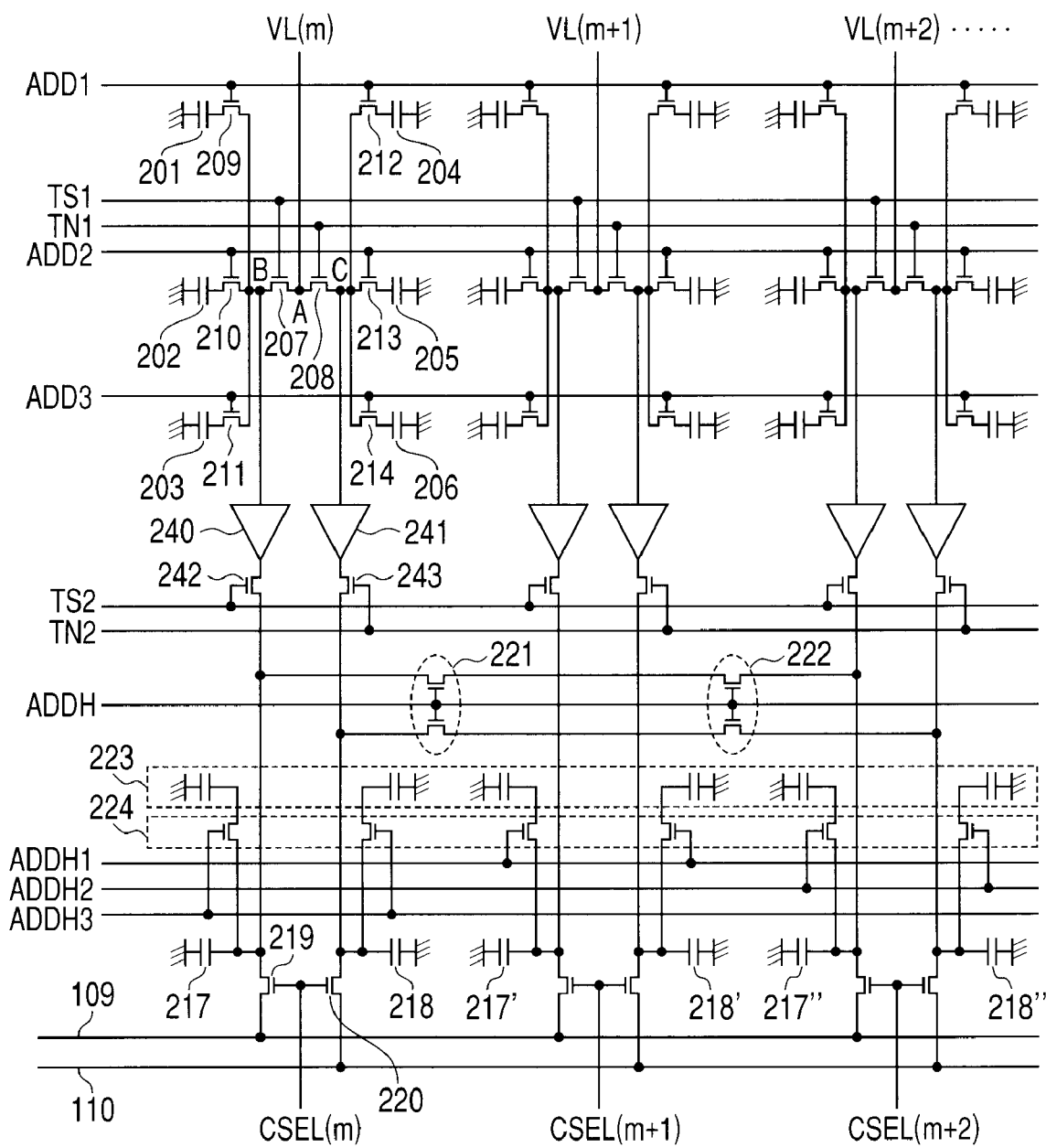
FIG. 11 is a diagram illustrating a schematic configuration example of a read out circuit according to a fifth embodiment of the present invention.

FIG. 11 is a diagram illustrating a configuration of a read out circuit according to this embodiment. In the following description, it is assumed that a configuration of pixels connected to vertical output lines is that illustrated in FIG. 1. The configuration illustrated in FIG. 11 is different from the configuration illustrated in FIG. 9 in that a fourth holding capacitor 223 as a fourth holding unit provided in parallel to the second holding capacitors 217 and 218 and a switch 214 for switching a connection state of the second and third holding capacitors are added. Switches 224 provided in respective columns are controlled according to different signals ADDH1 to ADDH3. By selectively controlling the signals ADDH1 to ADDH3, it is possible to take into account weighting when averaging in the horizontal direction is performed.

Figure 12:
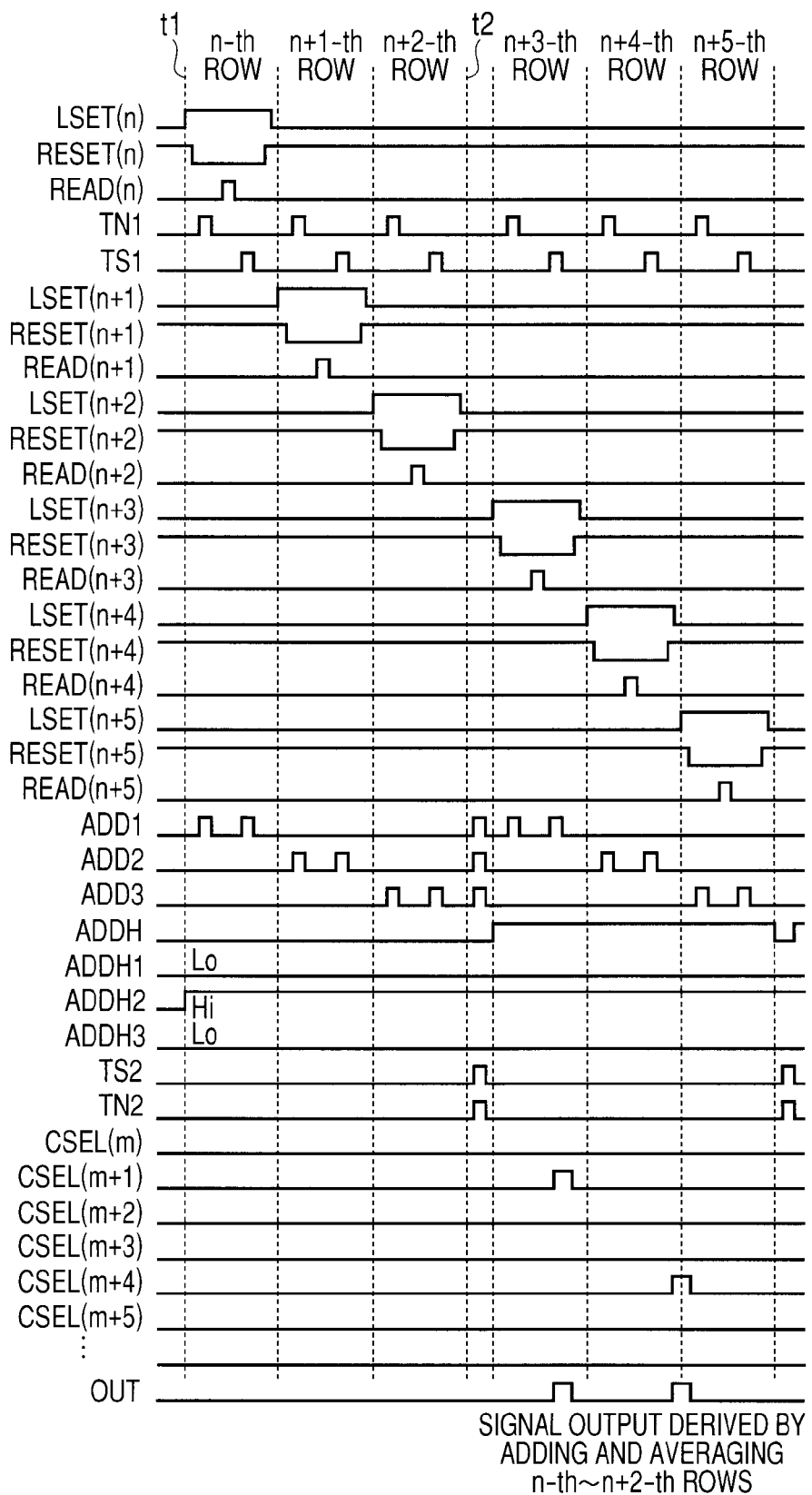
FIG. 12 is a diagram illustrating a driving pattern example in averaging operation according to the fifth embodiment of the present invention.

An example of driving timing for the read out circuit illustrated in FIG. 11 is illustrated in FIG. 12. The driving timing illustrated in FIG. 12 is different from the driving timing illustrated in FIG. 10 in that the signals ADDH1 to ADDH3 are added. In this example, a ratio of signals in a second column among mth to m+2th columns is set high. The signals ADDH1 to ADDH3 are maintained at the low level and, on the other hand, the signal ADDH2 is maintained at the high level. The fourth holding capacitors 223 are respectively added to the second holding capacitors 217' and 218' in the m+1th column. If capacitance values are equal in the second holding capacitors and the fourth holding capacitors, a signal obtained by weighted-averaging signals in the mth to m+2th columns at a ratio of 1:2:1 is output to the horizontal output line.

According to this embodiment, averaging with weighting in the horizontal direction taken into account is performed by the second holding capacitors and jaggy can be prevented. At least parts of the first step of causing the first holding capacitors to hold signals from pixels and the third step of outputting the signals held by the second holding capacitors to the horizontal output line are performed in parallel. This enables to quickly read out signals from plural pixels in the same column while adding the signals. Therefore, it is possible to improve a frame rate while preventing jaggy.

When the averaging with weighting in the horizontal direction taken into account is not performed in the second holding capacitors, the signals ADDH1, ADDH2 and ADDH3 may be always set to the high level to conduct the switch 224. For example, concerning the second holding capacitor 217, by connecting the second holding capacitor 217 with the fourth holding capacitor 223 corresponding to the second holding capacitor 217, the second holding capacitors can be treated as one large capacitor. Consequently, it is possible to reduce the kTC noise because of the reason described in the first embodiment.

The operation for sequentially reading out signals in one column at a time without performing the averaging in the horizontal direction in this way is used for an application such as still image photographing required of a high image quality, although not required of a very high frame rate. Therefore, a merit obtained by reducing the influence of the kTC noise is large.

(Sixth Embodiment)

A sixth embodiment of the present invention is described with reference to FIGS. 13 and 14.

Figure 13:
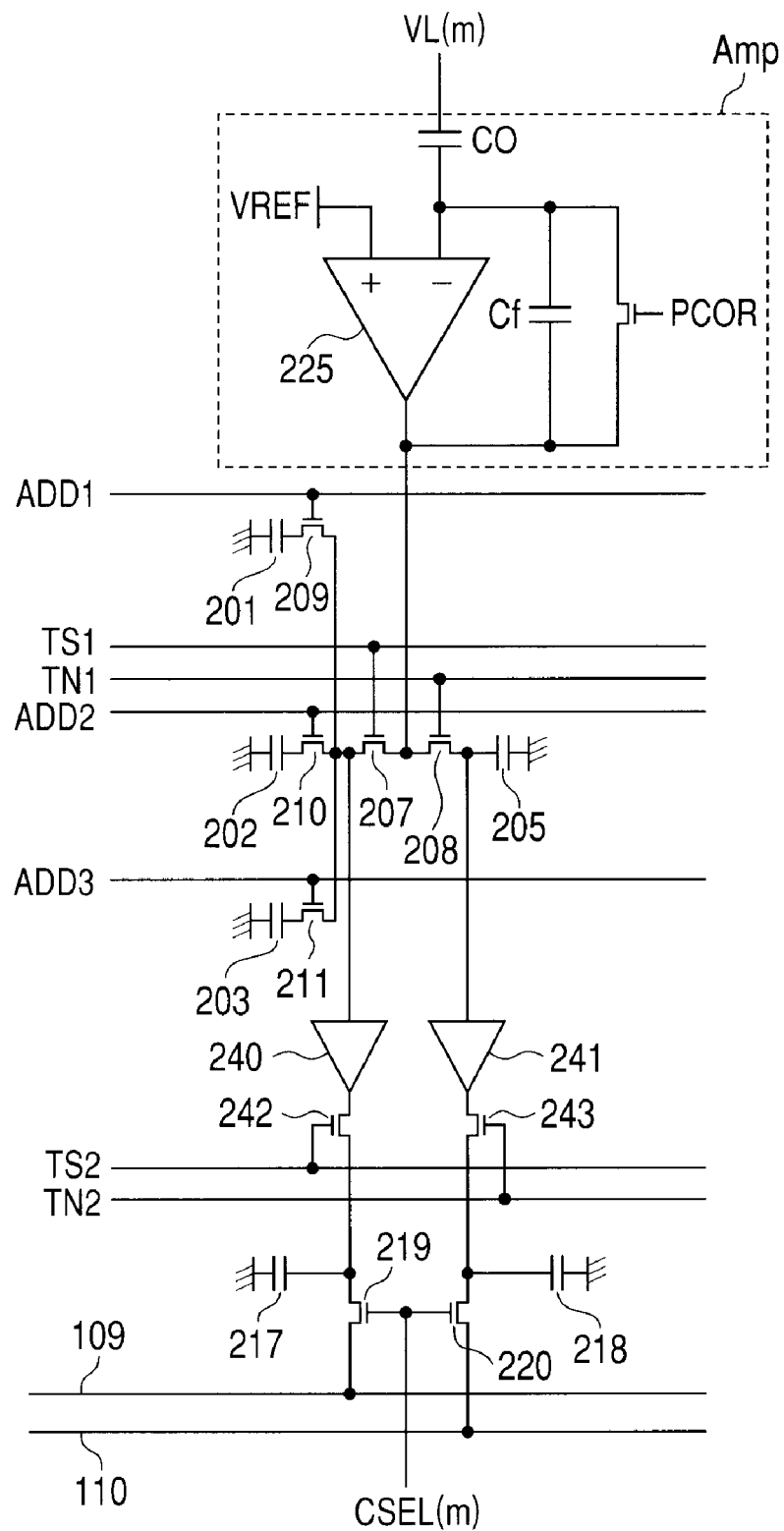
FIG. 13 is a diagram illustrating a schematic configuration example of a read out circuit according to a sixth embodiment of the present invention.

FIG. 13 is a diagram illustrating a configuration for one column of a read out circuit according to this embodiment. The configuration is different from the configuration of the read out circuit illustrated in FIG. 2 in that an amplifier Amp as a columnar amplifying unit connected to the vertical output line VL(m) is added and the six first holding capacitors in total provided in FIG. 2 are changed to four first holding capacitors. It is assumed that capacitance values of the first holding capacitors 201 to 204 are equal.

The amplifier Amp includes a differential amplifier 225 and a clamp capacitor C0, one terminal of which is connected to the vertical output line VL(m) and the other terminal of which is connected to an inverting input terminal of the differential amplifier 225. The amplifier Amp further includes a feedback capacitor Cf and a switch PC0R provided between the inverting input terminal and an output terminal of the differential amplifier 225. A reference voltage VREF is supplied to a non-inverting input terminal of the differential amplifier 225.

In the configuration illustrated in FIG. 2, the first holding capacitors 204 to 206 for noise are provided for the pixels. However, with the configuration according to this embodiment, since noise components that occur in the pixels can be removed by the clamp capacitor C0, only one holding capacitor 205 is sufficient as a first holding capacitor for noise. What is held by the first holding capacitor 205 for noise in this embodiment is an output offset caused by the amplifier Amp. An advantage realized by this configuration is that a layout area for the first holding capacitors can be reduced. Further, it is also one of advantages that a gain of a ratio Co/Cf of capacitance values of the clamp capacitor C0 and the feedback capacitor Cf can be applied to signals from the pixels.

Figure 14:
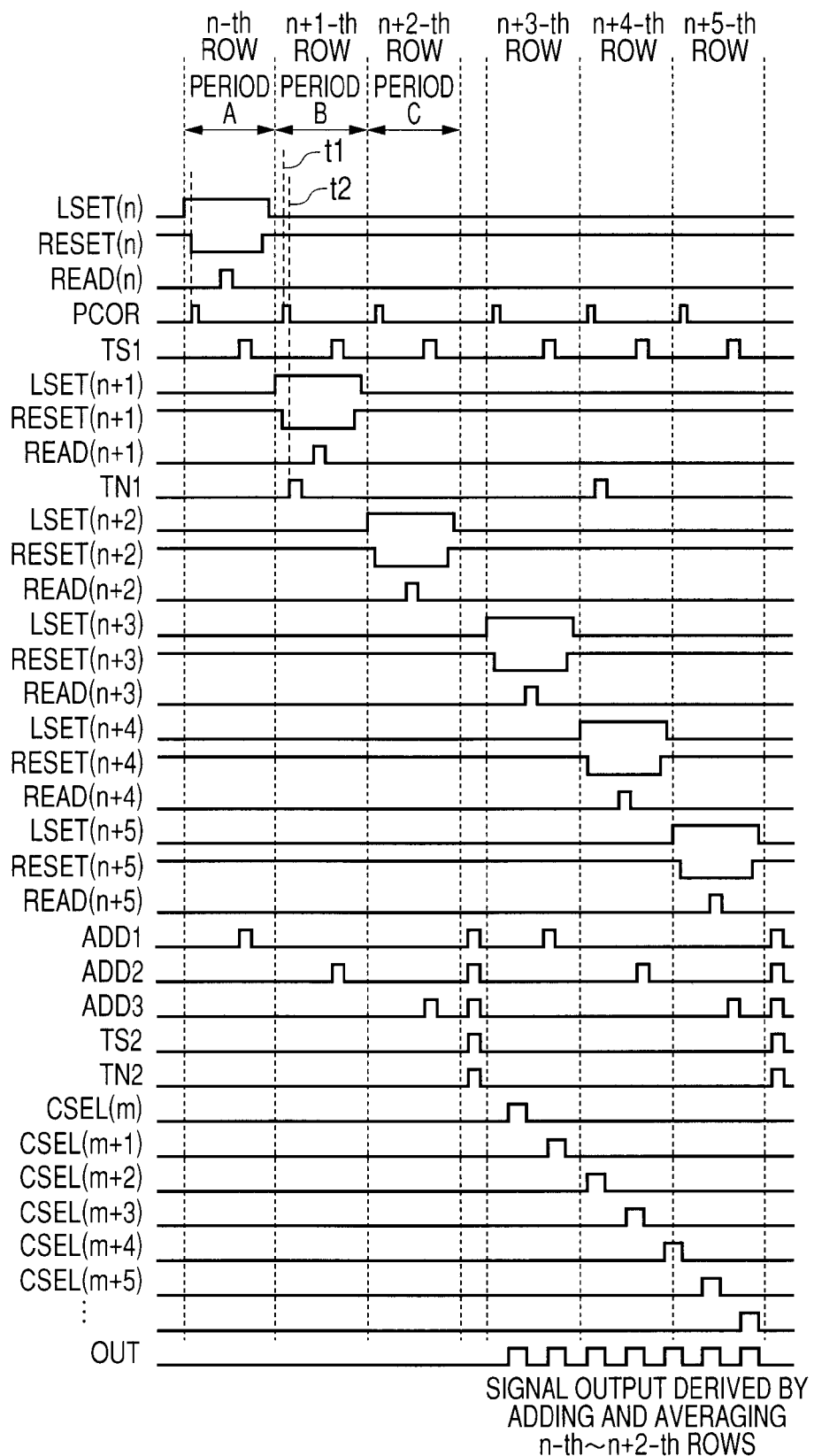
FIG. 14 is a diagram illustrating a driving pattern example in averaging operation according to the sixth embodiment of the present invention.

An example of driving timing for the read out circuit illustrated in FIG. 13 is illustrated in FIG. 14. Differences from the driving timing illustrated in FIG. 3 are mainly described.

Operation for reducing noise components due to pixels is described. Attention is paid to the period B. At time t1, when the signal PC0R is set to the high level, the differential amplifier 225 changes to a state of a voltage follower. At this point, a noise component from the pixels is input to the clamp capacitor C0. Thereafter, when the signal READ(n+1) is set to the high level, a signal obtained by superimposing a light signal on the noise component is output from the pixels. At this point, since the signal PC0R is at the low level, a difference between the signal and a noise component held by the clamp capacitor C0 in a period in which the signal PC0R is at the high level, i.e., (noise signal)−(noise signal+light signal) =(light signal), appears at the inverting input terminal of the differential amplifier 225. As described above, in this format, since the gain of C0/Cf is applied, the output of the amplifier Amp is output obtained by superimposing the light signal applied with the gain of C0/Cf and an output offset of the amplifier Amp.

In FIG. 14, operation for holding the output offset of the amplifier Amp in the first holding capacitor 205 is performed according to the signal TN1 in the period B. However, this operation may be performed in one of the period A and the period C instead of the period B.

Operation after the period C excluding operation for removing a noise of the pixels in the amplifier Amp is the same as the operation illustrated in FIG. 3. Therefore, description of the operation is omitted.

According to this embodiment, it is possible to remove noise components due to the pixels with the amplifiers Amp provided in the respective columns, reduce an area necessary for a layout of the first holding capacitors and apply a gain to a signal. Averaging in the vertical direction is performed by the first holding capacitors and jaggy can be prevented. At least parts of the first step of causing the first holding capacitors to hold signals from pixels and the third step of outputting the signals held by the second holding capacitors to the horizontal output line are performed in parallel. This enables to quickly read out signals from plural pixels in the same column while adding the signals. Therefore, it is possible to improve a frame rate while preventing jaggy.

(Seventh Embodiment)

A seventh embodiment of the present invention is described with reference to FIGS. 15 and 16.

Figure 15:
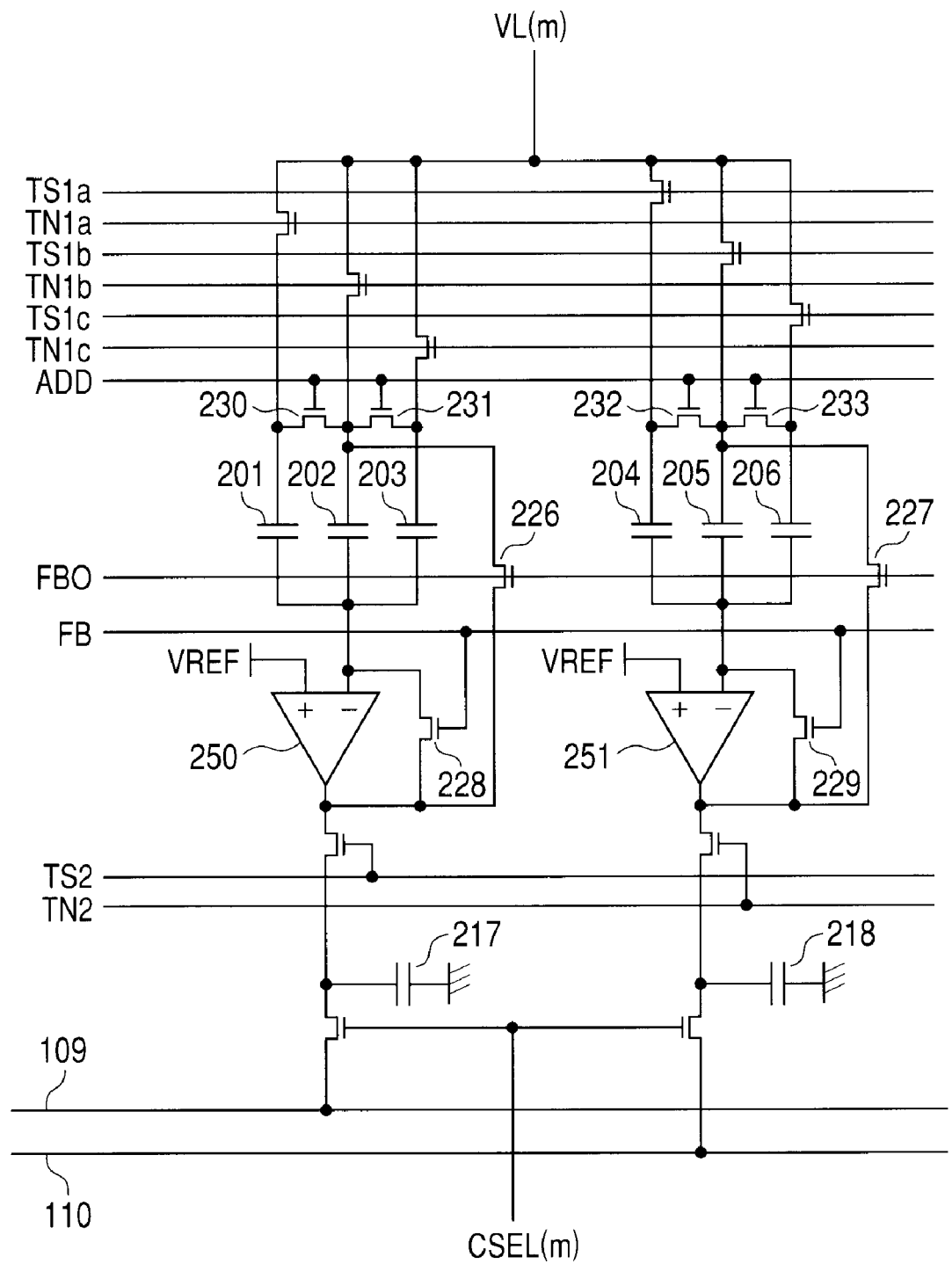
FIG. 15 is a diagram illustrating a schematic configuration example of a read out circuit according to a seventh embodiment of the present invention.

FIG. 15 is a diagram illustrating a configuration for one column of a read out circuit according to this embodiment. A main difference from the read out circuits described above is that first holding capacitors are connected in series between the vertical output lines VL and impedance converter. A differential amplifier is used as the impedance converter.

One terminals of the first holding capacitors 201 to 203 are short-circuited to one another and connected to the inverting input terminal of the differential amplifier 250. The other terminals of the first holding capacitors 201 and 203 are connected via switches 230 and 231 as first switches and connected to an output terminal of the differential amplifier 250 via a switch 226 as a second switch.

Figure 16:
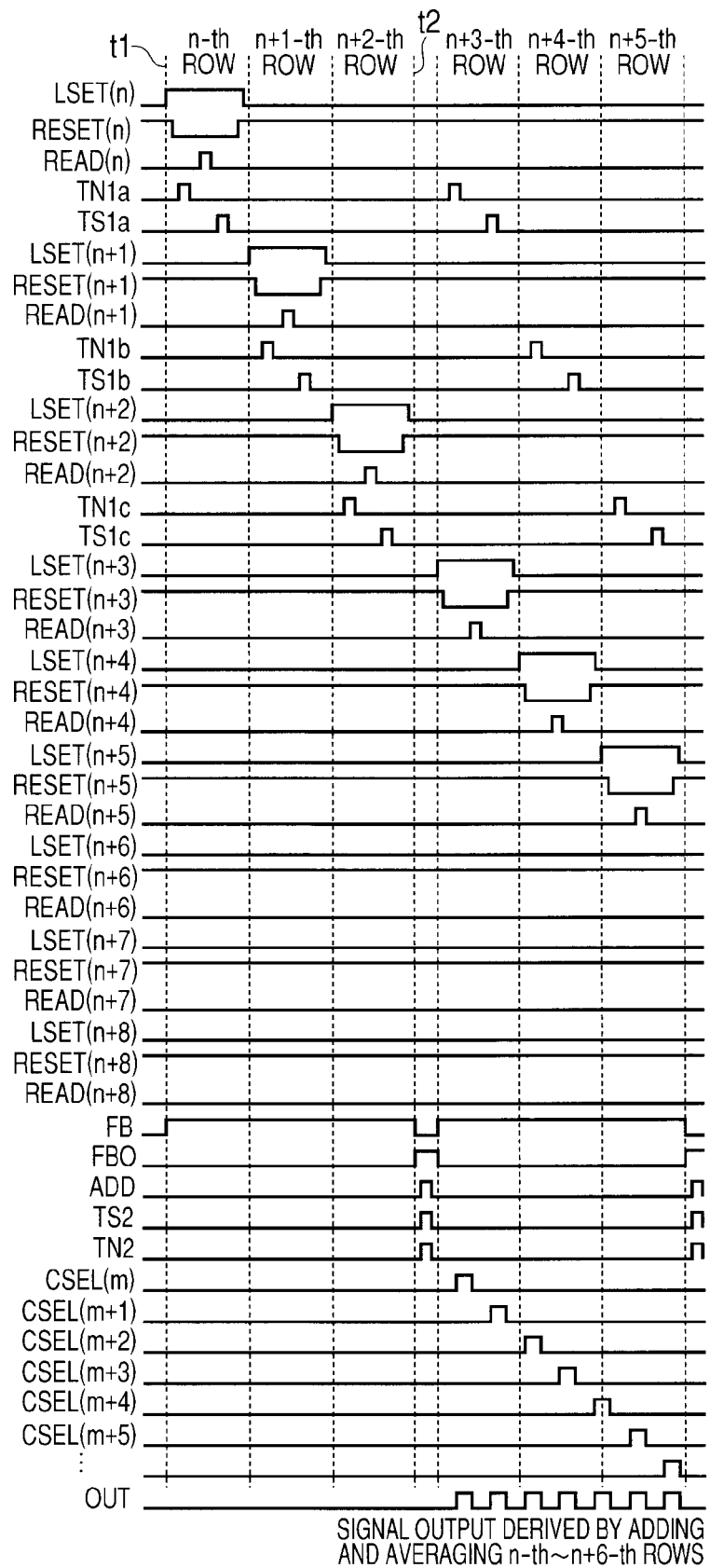
FIG. 16 is a diagram illustrating a driving pattern example in averaging operation according to the seventh embodiment of the present invention.

An example of driving timing for adding signals from pixels for three rows using the read out circuit illustrated in FIG. 15 is illustrated in FIG. 16.

First, at time t1 of a period "nth row", the signal LSET(n) changes to the high level and the selection transistor 107 included in a pixel in the nth row conducts. Consequently, a level corresponding to a gate potential of the amplification transistor 106 included in the pixel in the nth row appears in the vertical output line VL(m). Similarly, at time t1, since a signal FB changes to the high level, switches 228 and 229 in the read out circuit become conducive. Consequently, a potential of electrodes of the first holding capacitors connected to inverting input terminals of the differential amplifiers 250 and 251 reaches a level obtained by superimposing output offsets of the differential amplifiers 250 and 251 on VREF.

Subsequently, when the signal TN1a changes to the high level in a pulse-like manner, the signal TN1a is sampled and held by the first holding capacitor 201. A signal sampled and held by the first holding capacitor 201 is a noise component due to pixels.

When the signal READ(n) changes to the high level in a pulse-like manner, charges accumulated in the photodiode 100 are transferred to a node of the gate electrode of the amplification transistor 106. Consequently, a gate potential of the amplification transistor 106 fluctuates and a level corresponding to the gate potential appears in the vertical output line VL(m).

When the signal TS1a changes to the high level in a pulse-like manner, the signal TS1a is sampled and held by the first holding capacitor 204. A signal sampled and held by the first holding capacitor 204 is a signal obtained by superimposing a light signal accumulated in the photodiode 100 on a noise component due to pixels.

The same operation is repeated for the periods "n+1th row" and "n+2th row".

At time t2, the signal FB changes to the low level and a signal FBO changes to the high level. Thereafter, when a signal ADD changes to the high level, electrodes on the vertical output line VL(m) side of the first holding capacitors 201 to 203 are electrically connected. Therefore, signals held by the first holding capacitors 201 to 203 are averaged. Further, the electrodes on the vertical output line VL(m) side of the first holding capacitors 201 to 203 are electrically connected to the output terminal of the differential amplifier 250. According to this operation, a signal from which an output offset of the differential amplifier 250 is removed appears at the output terminal of the differential amplifier 250. A mechanism for removing the output offset of the differential amplifier 250 is described. In a state in which the signal FB is at the high level, the output offset of the differential amplifier 250 is also input to the inverting input terminal. The output offset is maintained by the first holding capacitors. Thereafter, when the signal FB changes to the low level and the signal FBO changes to the high level, terminals of the first holding capacitors connected to the vertical signal line VL(m) are electrically connected to the output terminal of the differential amplifier 250. Therefore, the output offset held by the first holding capacitors is cancelled. According to this operation, a signal from which the output offset of the differential amplifier 250 is removed appears at the output terminal of the differential amplifier.

Operation same as that for a path on the differential amplifier 250 side is performed for a path on the differential amplifier 251 side. Since the signals TS2 and TN2 change to the high level simultaneously with the signal ADD, a signal from which output offsets of the differential amplifiers 250 and 251 are removed is held by one of the second holding capacitors 217 and 218.

In the periods "n+3th row" to "n+5th row", operation same as that in the periods "nth row" to "n+2th row" is performed. However, the operation is different from that in the periods "nth row" to "n+2th row" in that the signal CSEL is supplied.

At least parts of a step of causing the first holding capacitors to hold signals based on pixels in the n+3th to n+5th rows and a step of outputting signals based on pixels in the nth to n+2th rows to the horizontal output line are temporarily overlapped.

According to this embodiment, averaging in the vertical direction is performed by the first holding capacitors and jaggy can be prevented. At least parts of the first step of causing the first holding capacitors to hold signals from pixels and the third step of outputting the signals held by the second holding capacitors to the horizontal output line are performed in parallel. This enables to quickly read out signals from plural pixels in the same column while adding the signals. Therefore, it is possible to improve a frame rate while preventing jaggy.

(Eighth Embodiment)

Figure 17:
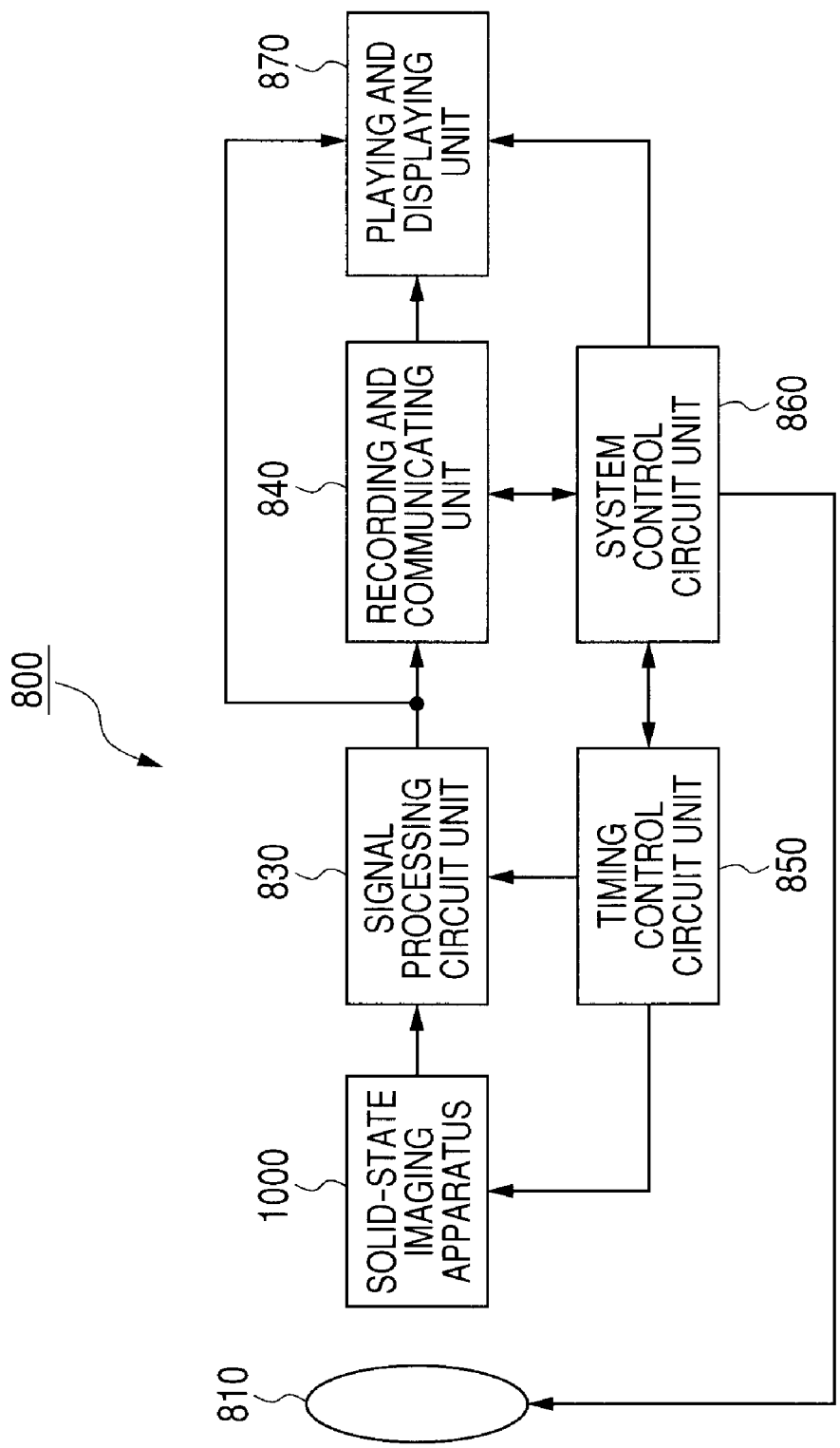
FIG. 17 is a diagram illustrating a schematic configuration example of an imaging system according to an eighth embodiment of the present invention.

An imaging system according to this embodiment is schematically described with reference to FIG. 17.

An imaging system 800 includes an optical unit 810, a solid-state imaging apparatus 1000, a signal processing circuit unit 830, a recording and communicating unit 840, a timing control circuit unit 850, a system control circuit unit 860 and a reproducing and displaying unit 870.

The optical unit 810 as an optical system such as a lens focus light from a subject on a pixel unit, in which plural pixels are arraying in a two-dimensional shape, of the solid-state imaging apparatus 1000 to form an image of the subject. The pixel unit includes an effective pixel region. The solid-state imaging apparatus 1000 outputs, at timing based on a signal from the timing control circuit unit 850, a signal corresponding to the light focused on the pixel unit.

The signal output from the solid-state imaging apparatus 1000 is input to the signal processing circuit unit 830 as a signal processing unit. The signal processing circuit unit 830 applies processing such as AD conversion to the input electric signal according to a method set by a computer program or the like. A signal obtained by the processing in the signal processing circuit unit 830 is sent to the recording and communicating unit 840 as image data. The recording and communicating unit 840 sends a signal for forming an image to the reproducing and displaying unit 870 and causes the reproducing and displaying unit 870 to reproduce and display a moving image or a still image. The recording and communicating unit 840 receives a signal from the signal processing circuit unit 830 and performs communication with the system control circuit unit 860. Besides, the recording and communicating unit 840 also performs operation for recording the signal for forming an image in a recording medium not illustrated in the figure.

The system control circuit unit 860 collectively controls the operation of the imaging system 800. The system control circuit unit 860 controls driving of the optical unit 810, the timing control circuit unit 850, the recording and communicating unit 840 and the reproducing and displaying unit 870. The system control circuit unit 860 includes a storage device as a recording medium not illustrated in the figure. A program and the like necessary for controlling the operation of the imaging system 800 are recorded in the storage device. In the imaging system 800, the system control circuit unit 860 supplies, for example, a signal for switching a driving mode according to operation of a user.

The timing control circuit unit 850 controls driving timing for the solid-state imaging apparatus 1000 and the signal processing circuit unit 830 based on the control by the system control circuit unit 860 as a control unit.

(Others)

In the examples described in the embodiments of the present invention, signals from pixels for three rows or six rows are averaged or subjected to charge addition and averaging. However, the number of pixels to be added or averaged is not limited and can be arbitrarily set.

The impedance converter included in the read out circuit is not an essential component and may be omitted. However, as described above, when the impedance converter is included, there is an advantage that it is possible to design a capacitance value of the first holding capacitors small compared with that of the second holding capacitors.

Two or more of the embodiments described above may be combined.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-231190, filed Sep. 9, 2008, which is hereby incorporated by reference herein in its entirety.

What is claimed is:

1. A solid-state imaging apparatus comprising:
   a plurality of pixels;
   a first signal line connected commonly to the plurality of pixels;
   a read out unit connected to the first signal line; and
   a control unit for controlling operations of the plurality of pixels and the read out unit, wherein
   the read out unit has a plurality of first holding units arranged in parallel to each other, and a second holding unit, and
   the control unit performs a first driving mode including a first step of storing one or more signals from the plurality of pixels in each of the plurality of first holding units; a second step of adding the signals from the plurality of pixels stored in the plurality of first holding units; and a third step of outputting the signal stored in the second holding unit, such that at least a part of a period of the first step is overlapped with a period of the third step.

2. The solid-state imaging apparatus according to claim 1, wherein
   the read out unit has at least two second holding units, and the solid-state imaging apparatus has an output unit for outputting a differential signal of a difference between signals output from at least two of the second holding units, and wherein
   the control unit
   causes a signal mainly of a noise component derived from the pixel and a signal in which the noise component is superimposed on a signal component derived from the pixel to be stored in different holding units, in the first step,
   causes each of a plurality of the signals mainly of the noise component and a plurality of signals in which the noise component is superimposed on the signal component to be added, in the second step, and
   causes a signal derived by adding, in the second step, each of the signals mainly of the noise component and the plurality of signals in which the noise component is superimposed on the signal component to be output to the output unit, in the third step.

3. The solid-state imaging apparatus according to claim 1, wherein
   the read out unit has a columnar output unit,
   the columnar output unit comprises:
   a differential amplifier;

a clamp capacitor having a terminal connected to the first signal line and the other terminal connected to an inverting input terminal of the differential amplifier;
a feedback capacitor having a terminal connected to the inverting input terminal of the differential amplifier and the other terminal connected to an output terminal of the differential amplifier; and
a switch for switching between conducting and non-conducting between the inverting input terminal and the output terminal of the differential amplifier.

4. The solid-state imaging apparatus according to claim 1, wherein
the control unit performs a second driving mode, and switches between the first and second driving modes,
the second driving mode including:
a fourth step of storing the signal from the pixel in the first holding units;
a fifth step of storing in the second holding unit the signals stored in the first holding unit, without adding the signals stored in the first holding units; and
a sixth step of outputting the signal stored in the second holding unit, such that at least a part of a period of the fourth step is overlapped with a period of the sixth step.

5. The solid-state imaging apparatus according to claim 1, wherein
the read out unit further comprises an impedance converter transmitting a signal from the plurality of first holding units to the second holding unit.

6. The solid-state imaging apparatus according to claim 5, wherein
the impedance converter is a differential amplifier, and
each of the first holding units has one and the other terminals, the one terminals of the plurality of the first holding units are short-circuited to each other and are connected to an inverting input terminal of the impedance converter, and the other terminals of the plurality of the first holding units are mutually connected via the first switch and connected via the second switch to an output terminal of the impedance converter.

7. The solid-state imaging apparatus according to claim 5, wherein
the first holding unit has a capacitance value smaller than that of the second holding unit.

8. The solid-state imaging apparatus according to claim 1, wherein
the plurality of pixels are arranged in a matrix,
only the plurality of pixels arranged along the same column are connected to the first signal line, and
the read out unit is arranged correspondingly to each of the columns of the pixels arranged in the matrix.

9. The solid-state imaging apparatus according to claim 8, wherein
the read out unit has a switch for connecting the second holding units of adjacent columns, and
the control unit sets the switch at a conducting state in the third step.

10. The solid-state imaging apparatus according to claim 8, wherein
the pixels arranged in the matrix are provided with color filters arranged in Bayer color array, and
the signals added in the second step are derived from the pixels provided with the filters of the same color.

11. An imaging system comprising:
a solid-state imaging apparatus according to claim 1;
an optical system for forming an image on a pixel region of the solid-state imaging apparatus; and
a signal processing unit for processing a signal output from the solid-state imaging apparatus to generate an image data.

12. A solid-state imaging apparatus comprising:
a plurality of pixels;
a first signal line connected commonly to the plurality of pixels;
a read out unit connected to the first signal line; and
a control unit for controlling operations of the plurality of pixels and the read out unit, wherein
the read out unit has a plurality of first holding units connected, to the first signal line, each through each of independently selectable switches, and a second holding unit for storing an addition signal derived by adding signals stored in the plurality of first holding units.

13. The solid-state imaging apparatus according to claim 12, wherein
the first and second holding units are connected through an impedance converter.

14. The solid-state imaging apparatus according to claim 13, wherein
the first holding unit has a capacitance value smaller than that of the second holding unit.

15. A driving method of a solid-state imaging apparatus comprising:
a plurality of pixels;
a first signal line connected commonly to the plurality of pixels; and
a read out unit connected to the first signal line, wherein the read out unit has a plurality of first holding units arranged in parallel to each other, and a second holding unit, and the driving method comprises:
a first step of storing one or more signals from the plurality of pixels in each of the plurality of first holding units;
a second step of adding the signals from the plurality of pixels stored in the plurality of first holding units; and
a third step of outputting the signal stored in the second holding unit, such that at least a part of a period of the first step is overlapped with a period of the third step.

16. The driving method according to claim 15, wherein
the read out unit has at least two second holding units, and the solid-state imaging apparatus has an output unit for outputting a differential signal of a difference between signals output from the at least two second holding units, and wherein
a signal mainly of a noise component derived from the pixel and a signal in which the noise component is superimposed on a signal component derived from the pixel are stored in different first holding units, in the first step,
each of a plurality of the signals mainly of the noise component are added, and a plurality of signals in which the noise component is superimposed on the signal component are added, in the second step, and
the signal derived by adding, in the second step, each of the signals mainly of the noise component and the plurality of signals in which the noise component is superimposed to the signal component are output to the output unit, in the third step.

17. The driving method according to claim 15, wherein
in the first step, an operation of storing, in the first holding unit, a signal from one or more of the plurality of pixels, and
in the second step, signals derived from the plurality of pixels and stored in the plurality of first holding units are added, and the added signals are stored in the second holding unit.

18. The driving method according to claim 15, wherein the plurality of pixels are arranged in a matrix,
only the plurality of pixels arranged along the same column are connected to the first signal line,
the read out unit is arranged correspondingly to each of the columns of the pixels arranged in the matrix,
the read out unit has a switch for connecting the second holding units of adjacent columns, and
the switch is set at a conducting state in the third step.

* * * * *